(12) United States Patent
Stanley

(10) Patent No.: US 6,608,767 B1
(45) Date of Patent: Aug. 19, 2003

(54) APPARATUS AND METHOD FOR SOFT SWITCHING OF PARALLEL SWITCH ASSEMBLIES

(75) Inventor: Gerald R. Stanley, Osceola, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 0 days.

(21) Appl. No.: 10/150,412

(22) Filed: May 17, 2002

Related U.S. Application Data

(63) Continuation-in-part of application No. 09/654,451, filed on Sep. 1, 2000, now Pat. No. 6,426,883.
(60) Provisional application No. 60/152,876, filed on Sep. 8, 1999.

(51) Int. Cl.[7] .............................................. H02M 3/335
(52) U.S. Cl. ......................................... 363/16; 363/124
(58) Field of Search .............................. 363/16, 17, 39, 363/97, 98, 132, 134, 124

(56) References Cited

U.S. PATENT DOCUMENTS

| | | |
|---|---|---|
| 5,287,261 A | 2/1994 | Ehsani |
| 5,307,004 A | 4/1994 | Carsten |
| 5,325,283 A | 6/1994 | Farrington et al. |
| 5,399,908 A | 3/1995 | Donaldson |
| 5,515,002 A | 5/1996 | Ideler |
| 5,673,188 A | 9/1997 | Lusher et al. |
| 5,856,919 A | 1/1999 | Moriarty, Jr. |
| 5,875,103 A | 2/1999 | Bhagwat et al. |
| 5,959,438 A | 9/1999 | Jovanovic et al. |
| 6,016,258 A | 1/2000 | Jain et al. |
| 6,426,883 B1 * | 7/2002 | Stanley .................. 363/16 |

FOREIGN PATENT DOCUMENTS

| | | |
|---|---|---|
| EP | 0798846 A2 | 10/1997 |
| JP | 07046853 | 2/1995 |

* cited by examiner

*Primary Examiner*—Adolf D. Berhane
(74) *Attorney, Agent, or Firm*—Brinks Hofer Gilson & Lione

(57) ABSTRACT

An apparatus and method for reducing power loss due to switching of a switch mode power converter includes a power converter having a plurality of switch assemblies, each connected in parallel through an inductor to a common output node and a diode connected to a second common output node, and a switch controller for activating and deactivating the plurality of switch assemblies during successive switching cycles. The controller activates and deactivates each switch assembly one time during each switching cycle and activates one subset of switch assemblies before activating the remaining switch assemblies. The switch controller provides enable signals to commute the subset of switch assemblies among the plurality of switch assemblies to be activated before the remaining switch assemblies. The switch controller includes a modulator for modulating a clock signal and demand signal, and at least one delay circuit for providing a signal which is delayed in time relative to the modulated signal. The switch controller further includes a logic circuit for receiving the modulated signal and delayed signal to generate the commuted enable signals.

22 Claims, 16 Drawing Sheets

APPARATUS AND METHOD FOR SOFT SWITCHING OF PARALLEL SWITCH ASSEMBLIES

This application claims the benefit pursuant to 35 U.S.C. §119(e) of U.S. provisional patent application Serial No. 60/152,876 entitled Low-Cost Soft Switching in Paralleled Switch Assemblies, filed on Sep. 8, 1999 which is hereby expressly incorporated herein by reference. Further, pursuant to 37 C.F.R. 1.53(b) this application is a continuation-in-part of U.S. patent application Ser. No. 09/654,451 now U.S. Pat. No. 6,426,883 entitled Apparatus and Method for Soft Switching of Parallel Switch Assemblies, filed on Sep. 1, 2000 which is hereby expressly incorporated herein by reference.

FIELD OF THE INVENTION

The present invention relates to an apparatus and method for providing soft switching of parallel switch assemblies, and more particularly to soft switching of parallel switch assemblies of a switch mode power converter.

BACKGROUND OF THE INVENTION

Conventional switch mode power converters employ controllable switch assemblies which each include a switch to alternately connect an inductor between the input and the output of the converter. Diodes are included in the switch assembly to provide isolation between the converter power input and output when the switch is closed.

As is well known in the art, the switches of such switch mode power converters lose substantial amounts of power during switching events. Regardless of the application of these power converters, for example, a motor speed control, a gradient amplifier, or a power supply, high power may exist across the switch terminals at the time the switch is activated and shortly thereafter. The diodes in the circuit typically will not cease conducting immediately when the switch is activated, but will allow reverse current to flow temporarily before "recovering" the ability to block reverse current and maintain reverse voltage.

The difficulty of constructing and implementing power converter switches increases as the current demands on the switches increase. Very large semiconductors, for example, often have low initial yields, generate significant heat and require special thermal mounting, and are difficult to electrically connect to other components in the circuit. Thus, most high current switches are made from parallel assemblies of smaller switches which are easier to construct. One tradeoff associated with the use of parallel switch assemblies, however, is the need to ensure accurate current sharing among the switches. Clearly, depending upon the electrical characteristics of each switch, there could be situations where one switch turns on before the other switches connected in parallel, or turns off, after the other switches. If one or more switches continues to operate at times different from the remaining switches, that switch may experience greater power dissipation and, over time, may fail.

Some conventional switch mode power converters employ an auxiliary power switch to achieve the enhanced efficiency of zero voltage switching ("ZVS") wherein the auxiliary switch is operated first to permit the voltage across the main switch to drop to zero before the switch is turned on. The auxiliary switch is typically coupled through a small inductor to the main switch circuit at the junction between the main switch and the anode of the switch assembly diode. Since the diode would generally be conducting such that it must be "reverse recovered" before the main switch can approach zero volts, the small inductance of the auxiliary switch can recover, rather than dissipate, the energy of the stored charge of the diode and the main switch circuit. Such auxiliary switches are generally configured to return the recovered energy to the main switch circuit after the ZVS event. However, additional switches result in additional expense which may prohibit the use of auxiliary switches in certain applications.

SUMMARY OF THE INVENTION

The present invention provides an apparatus and method for soft switching of parallel switch assemblies in a switch mode power converter including a plurality of switch assemblies joined by small inductances to a common node and individually controlled by a switch controller. The inductances function as resonant auxiliary switch inductors as well as traditional fast current sharing impedances. The switch controller enables a subset of switch assemblies (typically, one) during each switching cycle before enabling the remaining switch assemblies. The first enabled switch assembly hard recovers the energy stored in its diode, and soft recovers the diodes of the remaining switch assemblies. Additionally, the switch controller may disable a second subset of switch assemblies (typically, one) after the remaining switch assemblies have been disabled during each switching cycle. This zero current turn-off ("ZCT") technique ensures that most of the turn-off power loss occurs at the switch assembly which is disabled last. Moreover, the switch controller commutes the switch assemblies selected for the first and second subsets for each switching cycle.

The switch controller includes a clock circuit which provides a clock signal to a pulse width modulator. The pulse width modulator also receives a demand signal, such as the current demand of the power converter load, and outputs a modulated version of the demand signal. By passing the modulated signal through one or more delay circuits, and logically relating the delay signal(s) to the clock signal and/or the modulated signal, the switch controller provides enable inputs to the switches of each of the switch assemblies in a sequence that commutes the selection of the early enabled and late disabled switch assemblies. By selecting a different switch to be the first enabled and last disabled each switching cycle, the switch controller more evenly distributes the power losses and the attendant stresses across all of the switch assemblies included in the power converter.

In another embodiment, the switch controller includes capability to sense a ZVS condition. Activation of the switch assemblies during a switching cycle may therefore be performed when a zero voltage condition is sensed. Accordingly, when a first switch assembly(s) is activated, activation of a second switch assembly(s) may be delayed until the zero voltage condition is detected on the common node. In addition, the sensing capability may provide the capability of the switch controller to perform a regeneration cycle by deactivating the first switch assembly when the second switch assembly is activate and reactivating the first switch assembly when the zero voltage condition is sensed across the first switch assembly. ZVS condition sensing may also provide the ability of the switch controller to detect a fault based on the absence of an expected zero voltage condition within an allotted time interval.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

These and other features of the invention will become more apparent and the invention will be better understood upon reference to the following description of the invention in conjunction with the accompanying drawings wherein.

DETAILED DESCRIPTION OF EMBODIMENTS OF THE INVENTION

The embodiments of the invention described herein are not intended to be exhaustive or to limit the invention to the precise forms disclosed. Rather, the embodiments selected for description have been chosen to enable one skilled in the art to practice the invention.

Figure 1:
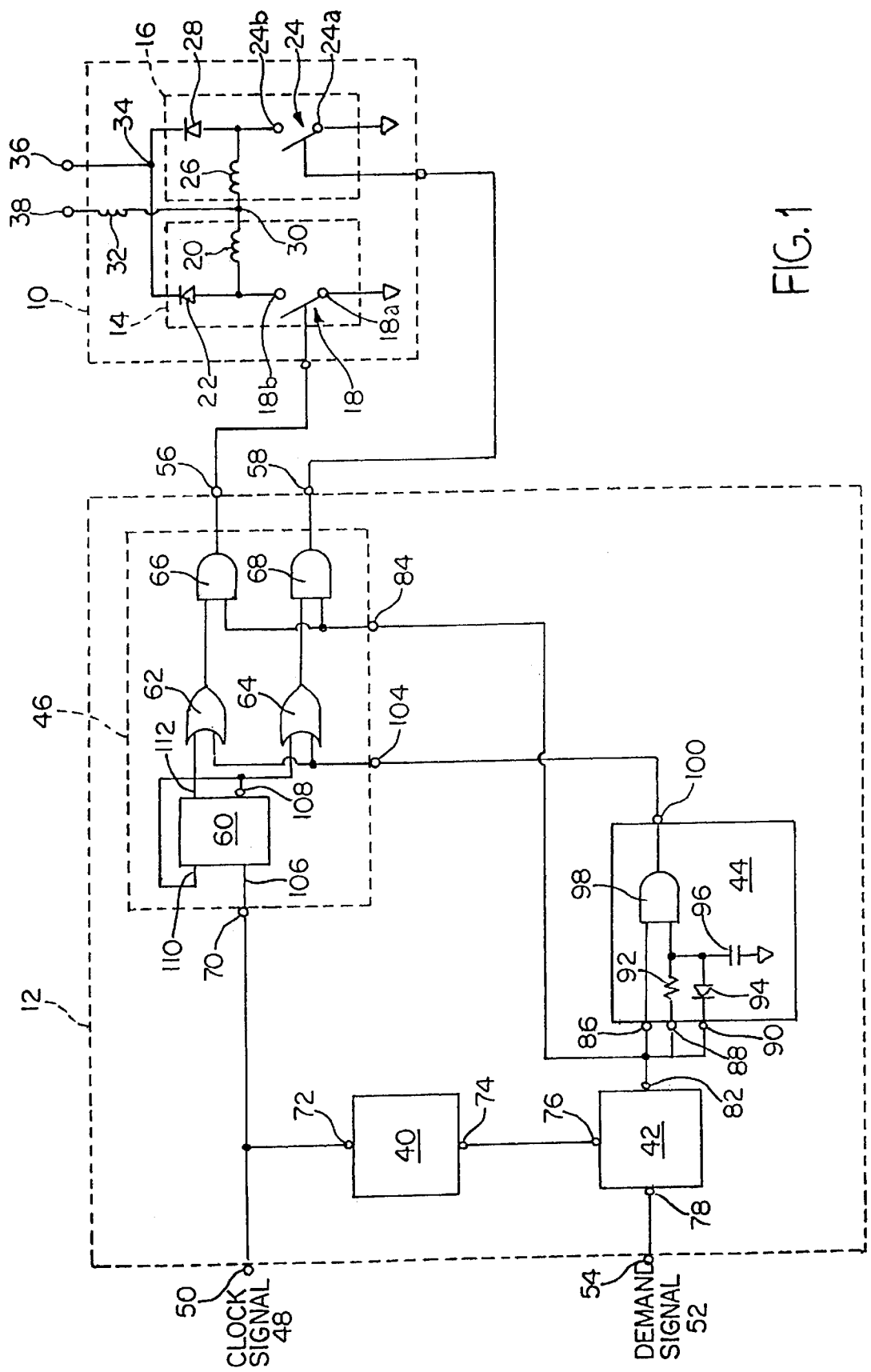
FIG. 1 is a schematic diagram of one embodiment of an apparatus for soft switching of parallel switch assemblies in a switch mode power converter.

FIG. 1 shows a two-switch parallel power switching assembly 10 connected to a switch controller 12. Assembly 10 includes switch assemblies 14, 16, and is used as a portion of a larger power converter. Switch assembly 14 includes a switch 18, typically a MOSFET or IGBT switch, an inductor 20, and a diode 22. Similarly, switch assembly 16 includes a switch 24, an inductor 26, and a diode 28. Nodes 18a and 24a of switches 18 and 24, respectively, are connected to a common node such as ground. Node 18b of switch 18 is connected to the anode of diode 22 and one side of inductor 20. Node 24b of switch 24 is similarly connected to diode 28 and inductor 26. The other sides of inductors 20 and 26 are connected to common node 30, which is connected to an inductor 32. Inductor 32 may be either a part of a filter circuit or a portion of the load driven by power switching assembly 10, such as a gradient coil or a winding of a motor. Inductor 32 is also connected to terminal 38. The cathodes of diodes 22, 28 are connected to another common node 34, which is connected to terminal 36. In a buck-derived power converter, terminal 36 receives incoming power and terminal 38 outputs power at a reduced voltage and increased current. In a boost-derived power converter, power is received on terminal 38 and outputted at an increased voltage and reduced current on terminal 36.

Switch controller 12 includes a triangle generator 40, a modulator 42, a delay generator 44, and a logic circuit 46. A clock signal 48, such as a square wave, is provided at input 50 of switch controller 12. A demand signal 52, for example, an input from an error control amplifier, or feedback signal from the controlled system, is provided at input 54 of switch controller 12. Outputs 56, 68 of switch controller 12 are connected to and control the operation of switches 18 and 24, respectively.

Logic circuit 46 includes a flip-flip 60, OR gates 62, 64, and AND gates 66, 68. Input 50 of switch controller 12 is connected to input 70 of logic circuit 46 and input 72 of triangle generator 40. Output 74 of triangle generator 40 is connected to input 76 of modulator 42. Input 78 of modulator 42 receives demand signal 52 from input 54 of switch controller 12. Modulator 42 outputs a modulated signal 80 on output 82. Output 82 is connected to delay generator 44 at inputs 86, 88, 90 and input 84 of logic circuit 46. Delay generator 44 includes a resistor 92, a diode 94, a capacitor 96, and an AND gate 98. One input of AND gate 98 is connected to delay generator input 86. The other input is connected to the anode of diode 94, one side of resistor 92, and one side of capacitor 96. The other side of resistor 92 is connected to delay generator input 88. The cathode of diode 94 is connected to delay generator input 90. The other side of capacitor 96 is connected to ground. The output of AND gate 98 is connected to output 100 of delay generator 44. Output 100 carries a delay signal 102 to input 104 of logic circuit 46.

Input 70 of logic circuit 46 is connected to input 106 of flip-flop 60. Flip-flop output 108 is connected to "D" input 110 and to one input of OR gate 64. Flip-flop output 112 is connected to one input of OR gate 62. Input 104 from delay generator 44 is connected to the other input of OR gates 62, 64. The outputs of OR gates 62, 64 are connected to one of the inputs of AND gates 66, 68, respectively. The modulated signal 80 received at logic circuit input 84 is routed to the other inputs of AND gates 66, 68.

Figure 2:
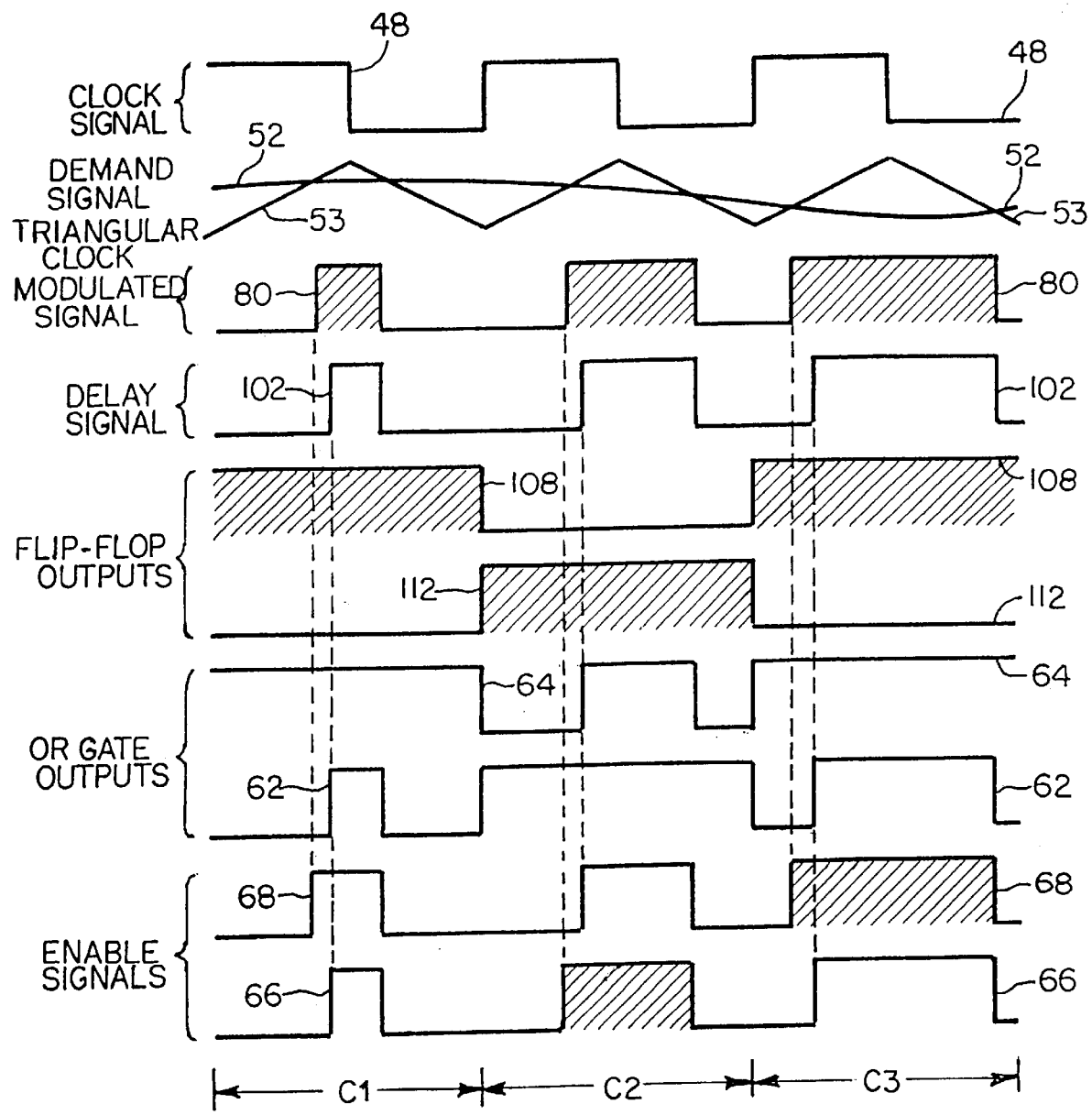
FIG. 2 is a waveform diagram depicting signals at various locations of the schematic of FIG. 1.

Referring now to FIG. 2, square wave clock signal 48. Clock signal 48 drives triangle generator 40 which outputs triangular clock signal 53, shown along with demand signal 52. As should be understood by one of ordinary skill in the art, non-square clocks may also be used to form saw tooth modulation waveforms such as triangular clock signal 53. Modulator 42 outputs modulated signal 80 which includes a series of pulses. Each pulse has a duration corresponding to a time period wherein triangular clock signal 53 is positive relative to demand signal 52. Delay generator 44 produces a delay only on the leading edge of each pulse of delayed signal 102. The trailing edge of each pulse of delay signal 102 occurs substantially simultaneously with the trailing edge of the corresponding pulse of modulated signal 80. The delay on the leading edge of delay signal 102 is proportional to the time constant formed by resistor 92 and capacitor 96 of delay generator 44. Diode 94 permits quick discharge of capacitor 96 when modulated signal 80 goes low. The components should be selected such that if a modulated signal 80 pulse duration is shorter than the delay generator 44 delay, then delay signal 102 will remain low during that particular switching cycle C1, C2, C3.

Clock signal 48 also results in flip-flop output 108, which transitions on the rising edge of clock signal 48. The inverse of output 108 appears at output 112 of flip-flop 60. The output of OR gate 64 is a logic high whenever either delay signal 102 or flip-flop output 108 is a logic high. Similarly, the output of OR gate 62 is a logic high whenever either delay signal 102 or flip-flop output 112 is a logic high. Since both output 62 and modulated signal 80 must be a logic high for AND gate 66 to output an enable signal 66 on switch controller output 56, the pulses of the enable signal 66 alternate with each switching cycle C1, C2, C3 between replicating a pulse of modulated signal 80 and a pulse of delay signal 102. Conversely, enable signal 68 from AND gate 68 alternates between replicating pulses of delay signal 102 and modulated signal 80. As can be seen by comparing enable signals 68, 66 of FIG. 2, during every other switching cycle C1, C2, C3, the leading edge of one of the waveforms is delayed in time relative to the leading edge of the other waveform. The trailing edge of both enable signals 68, 66 occur at substantially the same time.

The delay between the leading edges of enable signals 68, 66 is set to allow ZVS to form at the highest usable current of power switching assembly 10. The greater the current to be provided by assembly 10, the longer the delay generator 44 delay must be to achieve ZVS to recover the charges in diodes 22, 28.

As should be readily apparent to one of ordinary skill in the art, the components included in logic circuit 46 constitute one of many possible implementations to logically convert the input signals 48, 52 to enable signals 68, 66. Clearly, negative logic could readily be implemented, and any of various logic implementations could be implemented in, for example, a programmable logic device.

Theoretically, the two-switch power switching assembly 10, when operated in the manner described above, can result in one-half the turn-on losses that would otherwise be experienced without implementing a ZVS method. As a practical matter, however, the power loss associated with the added current burden on the switch assembly 18 or 24 used as an auxiliary switch will preclude a 50% reduction in power loss. Nonetheless, a reduction of power loss approaching the limit of 1/n of the power losses associated with standard non-ZVS methods (where n is the number of switch assemblies) should be realized. In high frequency power converter applications, where turn-on loss is a major percentage of the total power loss, a reduction in total power loss of greater than 50% may be realized. It should be understood that a practical limit exists on the number of switch assemblies (n) used in this design. For each switch assembly added to the converter, a reduction in power loss should occur. However, an increase in total current to be recovered by the selected switch will also occur. Accordingly, for larger assemblies, multiple parallel power switching assemblies 10 may be employed, each under the control of a switch controller 12 according to the procedure outlined above. In the case of multiple parallel power switching assemblies 10, the limit for reduction of turn-on power loss is m/n (where m is the number of parallel power switching assemblies 10 used).

As should be apparent from the foregoing, the principles of the present invention may be employed to enable a subset of the total number of switch assemblies 14, 16 where more than two switch assemblies make up a parallel power switching assembly 10. For example, if four switch assemblies were employed in a single parallel power switching assembly 10, enable signal 66 could be connected to two switch assemblies, and enable signal 68 could be connected to the two remaining switch assemblies. As such, during each switching cycle, a subset of the total number of switch assemblies would be enabled before the remaining switch assemblies are enabled. In any event, however, logic circuit 46 should be implemented to ensure that no switch assembly selected as part of the subset of switch assemblies during one switching cycle is also selected as part of the subset of switch assemblies of the next switching cycle. In other words, the subsets of switch assemblies should be commuted in the same manner as the individual switch assemblies are commuted according to the principles outlined above.

Figure 3:
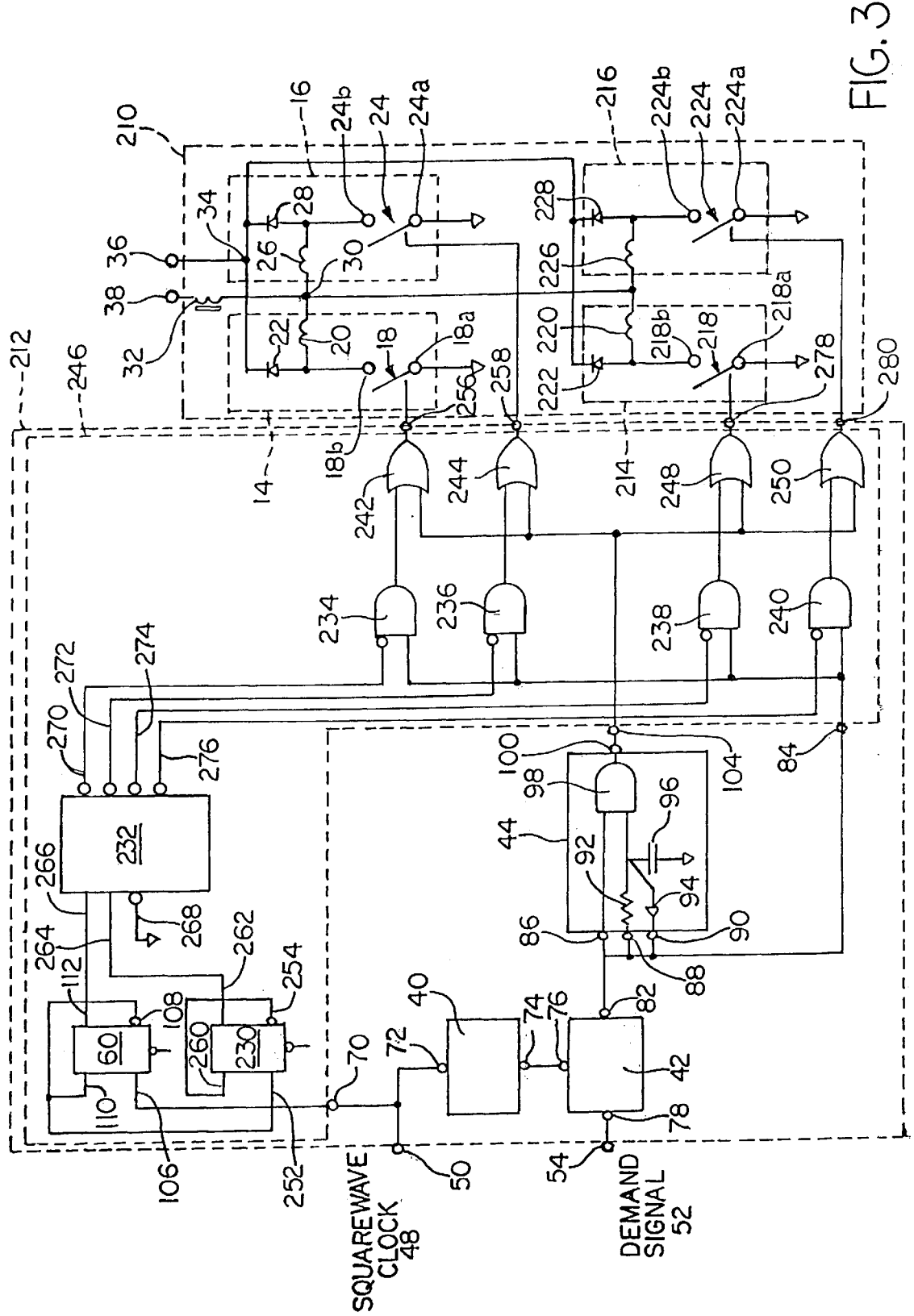
FIG. 3 is a schematic diagram of another embodiment of an apparatus according to the present invention.
Figure 4:
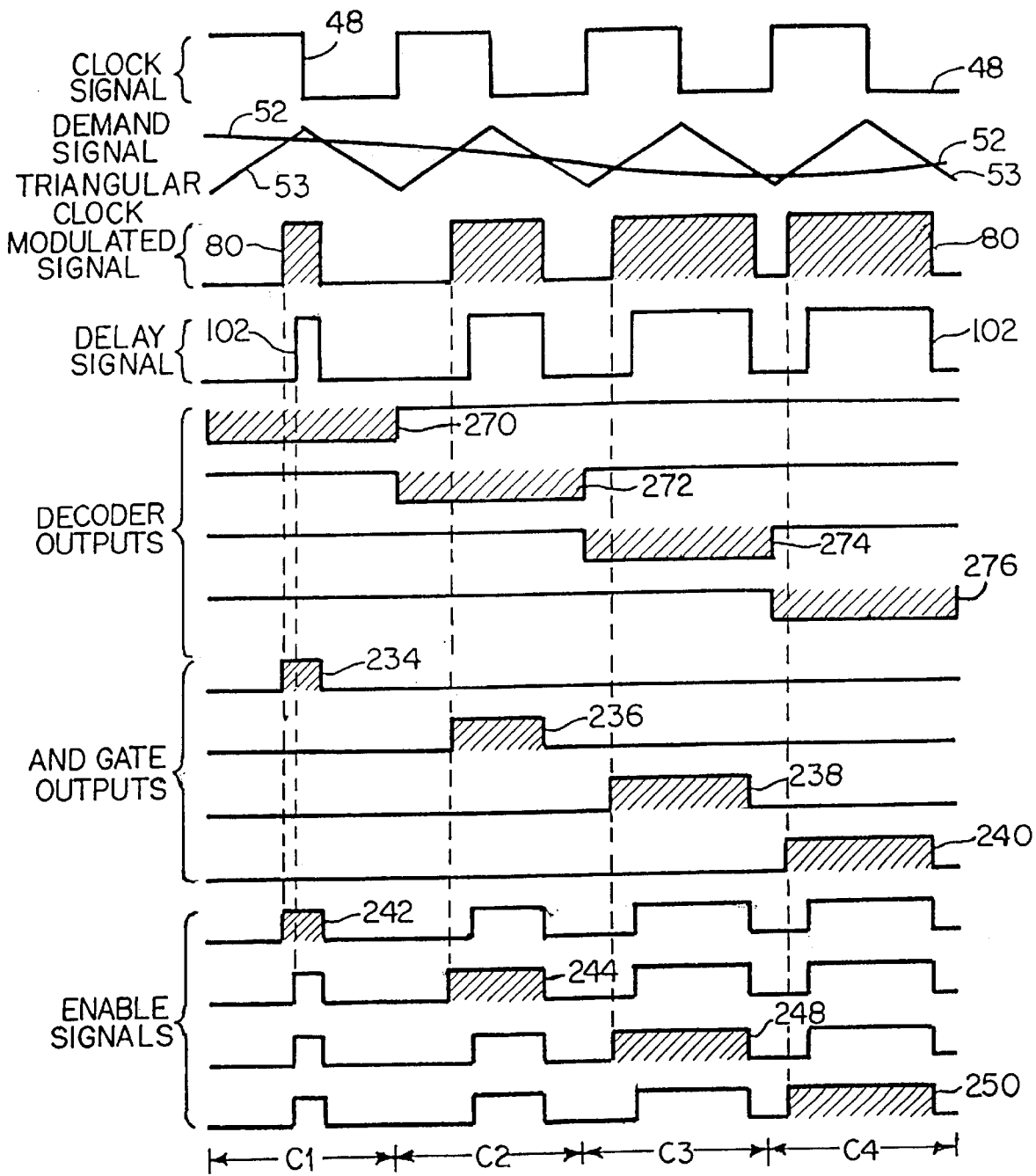
FIG. 4 is a waveform diagram similar to FIG. 2 of the embodiment of FIG. 3.

FIGS. 3 and 4 show an extension of the present invention to a power converter having four switch assemblies. The components and waveforms in common with those of FIGS. 1 and 2 retain their original reference designations. Referring to FIG. 3, a parallel power switching assembly 210 includes four switch assemblies 14, 16, 214, 216. Switch assemblies 14 and 16 are identical to those described in conjunction with the description of FIG. 1. Switch assemblies 214 and 216 are the same as switch assemblies 14 and 16, and use the same reference designations, increased by 200. Inductors 220 and 226 are connected to common node 30. Diodes 222 and 228 are connected to common node 34, thereby completing the parallel configuration of switch assemblies 14, 16, 214, 216.

Switch controller 212 includes triangle generator 40, modulator 42, delay generator 44, and modified logic circuit 246. Logic circuit 246 includes a first flip-flop 60 (identical to flip-flop 60 of FIG. 1), a second flip-flip 230, a decoder 232, AND gates 234, 236, 238, 240 and OR gates 242, 244, 248, 250. Output 108 of flip-flop 60 is connected to input 252 of flip-flop 230. Inverting output 254 of flip-flop 230 is connected to input 260, and output 262 is connected to input 264 of decoder 232. Similarly, output 112 of flip-flop 60 is connected to decoder input 266. Decoder input 268 is connected to ground. Decoder outputs 270, 272, 274, 276 are connected to the inverting input of AND gates 234, 236, 238, 240, respectively. The other input of each AND gate 234, 236, 238, 240 is connected to logic circuit input 84, which receives modulated signal 80.

The outputs of AND gates 234, 236, 238, 240 are connected to an input of OR gates 242, 244, 248, 250, respectively. The other input of each OR gate 242, 244, 248, 250 is connected to logic circuit input 104, which receives delay signal 102. The output of OR gate 242 is connected to logic circuit output 256 and controls switch 18. Similarly, the outputs of OR gates 244, 248, 250 are connected to logic circuit outputs 258, 278, 280, respectively, and control switches 24, 218, 224, respectively.

It should be noted that AND gates 234, 236, 238, 240 and OR gates 242, 244, 248, 250 of FIG. 3 perform the same signal processing functions as gates 62, 64, 66, 68 of FIG. 1. The gating configuration of FIG. 3 simply illustrates another of many possible logical implementations according to the present invention. Additionally, the logic gates of FIG. 3 could readily be replaced with conventional logic arrays of a programmable logic device.

Referring now to FIG. 4, four switching cycles are shown, C1, C2, C3, and C4. As was the case with the embodiment of FIGS. 1 and 2, triangle generator 40 outputs triangular clock signal 53 as a function of clock signal 48. Modulated signal 80 is output by modulator 42 as a logic high signal whenever triangular clock signal 53 is positive relative to demand signal 52. Modulated signal 80 is passed through delay generator 44 to result in delay signal 102. As is shown in the figure, the leading edge of delay signal 102 is delayed in time relative to the leading edge of modulated signal 80.

Clock signal 48 is also routed through series flip-flops 60, 230, which provide alternating inputs to decoder 232. Decoder 232 is a two-to-four line negative true decoder which sequentially outputs a logic low on each of its outputs 270, 272, 274, 276 for the duration of an entire switching cycle C1, C2, C3, C4. Each of decoder outputs 270, 272, 274, 276 is inverted at its corresponding inverting input of AND gates 234, 236, 238, 240. Accordingly, AND gates 234, 236, 238, 240 output a logic high signal when the corresponding decoder output is a logic low and modulated signal 80 is a logic high. The result is a pulse corresponding to modulated signal 80 outputted by a different AND gate 234, 236, 238, 240 for each switching cycle C1, C2, C3, C4 as shown in FIG. 4.

OR gates 242, 244, 248, 250 compare AND gate outputs 234, 236, 238, 240, respectively, with delay signal 102. For example, when AND gate output 234 is a logic high, or delay signal 102 is a logic high, OR gate output 242 is a logic high. As a result of this operation, for each of switching cycles C1, C2, C3, C4, a different enable signal 242, 244, 248, 250 transitions to a logic high before the remaining enable signals transition to a logic high. By commuting enable signals 242, 244, 248, 250 in this matter, switch assemblies 14, 16, 214, 216 are commuted to more evenly distribute the power losses and stresses associated with the switch mode power converter according to the present invention.

Figure 5:
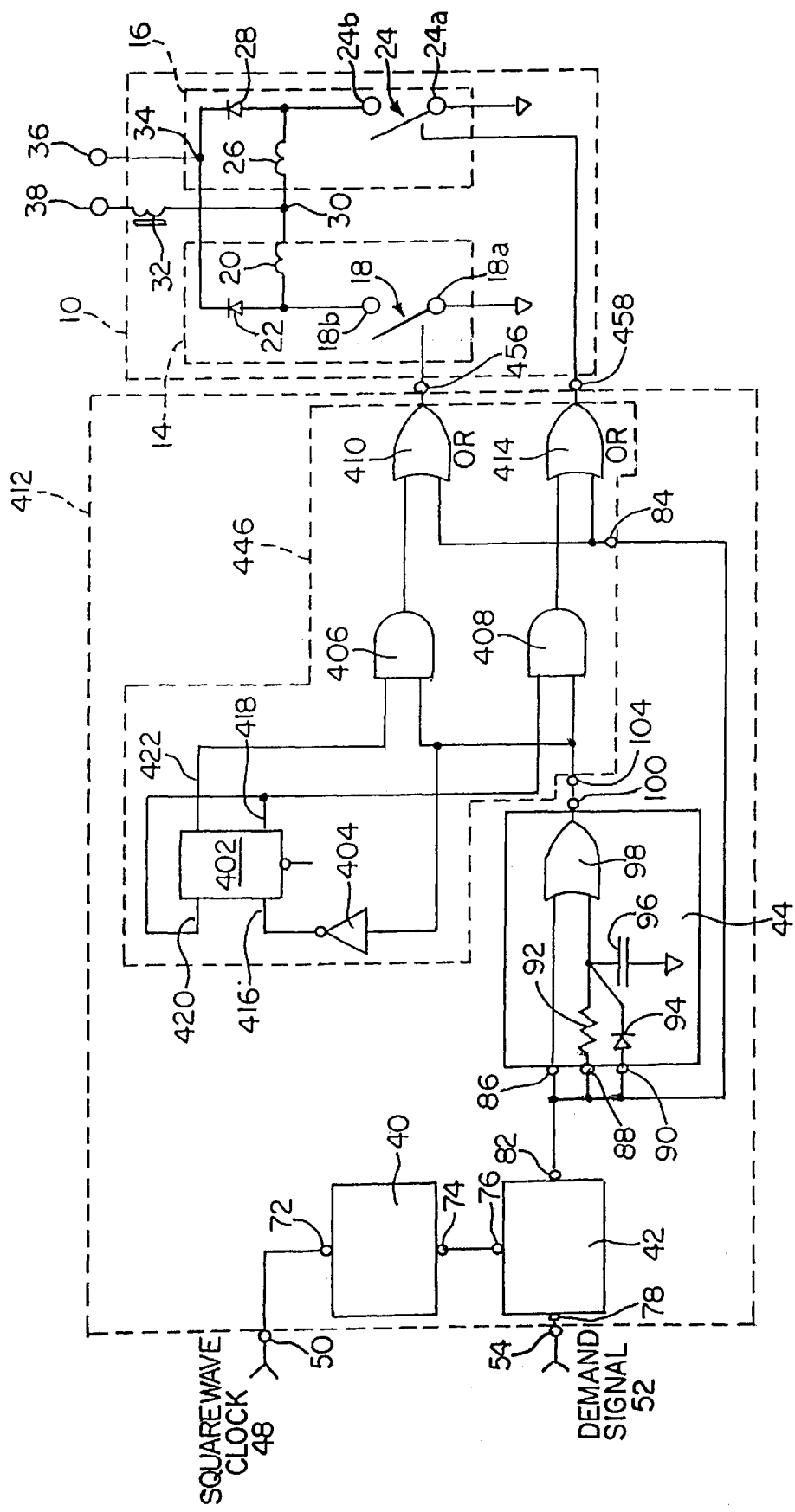
FIG. 5 is a schematic diagram of another embodiment of an apparatus according to the present invention.
Figure 6:
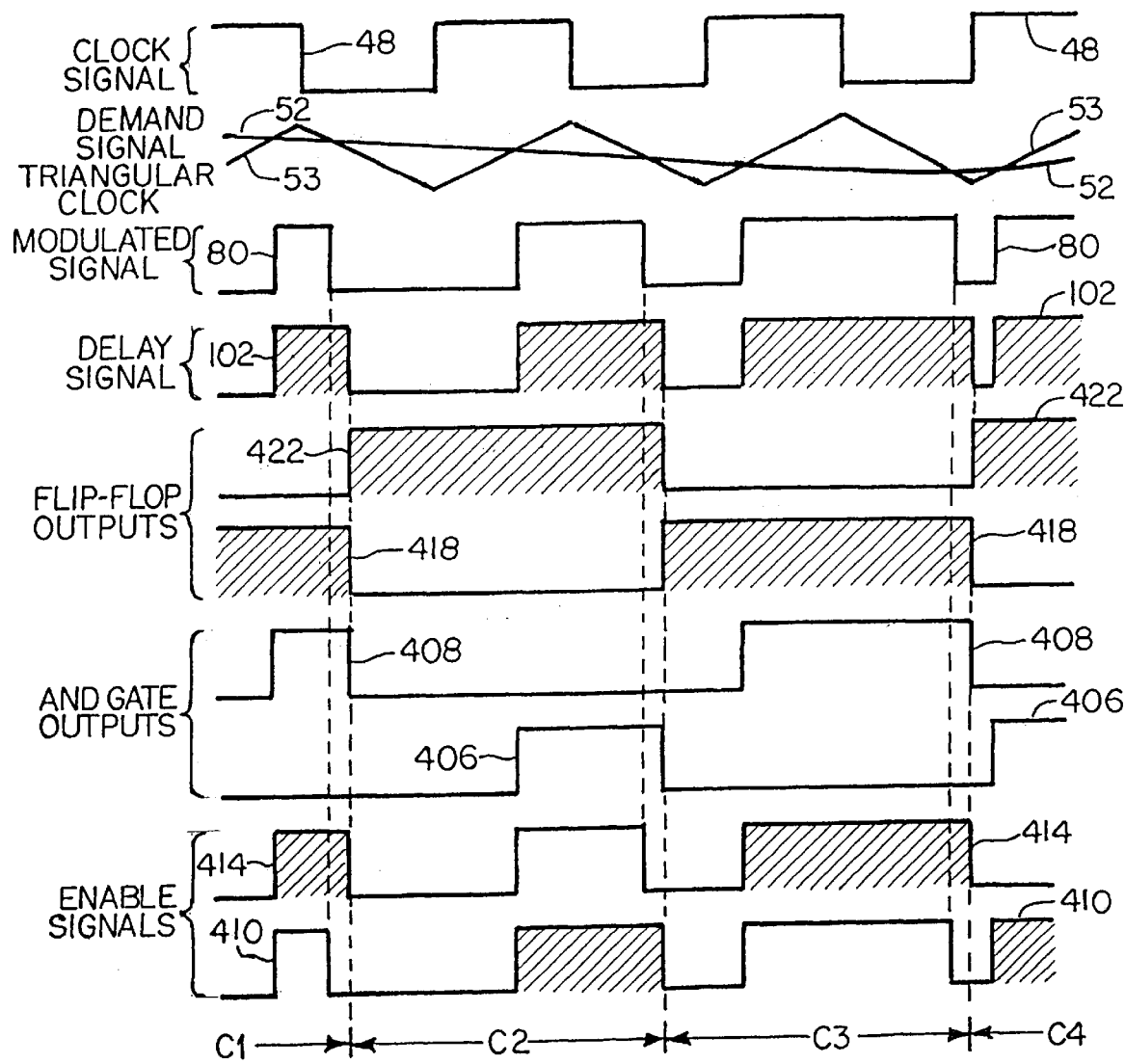
FIG. 6 is a waveform diagram similar to FIG. 2 of the embodiment of FIG. 5.

FIGS. 5 and 6 show another embodiment of the switch commutation concept according to the present invention, applied to reduce turn-off power losses by approaching zero current turn-off ("ZCT") in a switch mode power converter. In this embodiment, one switch assembly, or a subset of switch assemblies, is disabled after the remaining switch assemblies are disabled to reduce turn-off power loss.

Referring now to FIG. 5, two-switch parallel power switching assembly 10 is identical to that shown in FIG. 1. Additionally, triangle generator 40, modulator 42, and delay generator 44 are the same as those shown in FIG. 1, except that diode 94 of delay generator 44 is reversed in direction and gate 98 is an OR gate instead of an AND gate. Switch controller 412 also includes a modified logic circuit 446. Logic circuit 446 includes a flip-flop 402, an inverter 404, AND gates 406, 408, and OR gates 410, 414. Delay generator output 100 is connected to logic circuit input 104, one input of AND gates 406, 408, and the input of inverter 404. Inverter 404 is connected to input 416 of flip-flop 402. Inverted output 418 of flip-flop 402 is connected to the other input of AND gate 408, and input 420 of flip-flop 402. Output 422 of flip-flop 402 is connected to the other input of AND gate 406.

The outputs of AND gates 406, 408 are connected to an input of OR gates 410, 414, respectively. The other inputs to OR gates 410, 414 are driven by modulated signal 80, which is routed through logic circuit input 84. The outputs of OR gates 410, 414 drive switch assemblies 14, 16 as described above.

In operation, square wave clock signal 48 (FIG. 6) is converted into triangular clock signal 53 by triangle generator 40. Triangular clock signal 53 and demand signal 52 are modulated by modulator 42, resulting in modulated signal 80. Modulated signal 80 is passed through delay circuit 44 to result in delay signal 102. As shown in FIG. 6, the trailing edge of each pulse of delay signal 102 is delayed in time relative to the modulated signal 80. Delay signal 102 is routed through inverter 404 and flip-flop 402 to produce flip-flop outputs 418, 422, each of which transitions from one state to the other at the trailing edge of delay signal 102. The output of AND gate 408 is a logic high whenever both delay signal 102 and flip-flop output 418 are a logic high. Similarly, the output of AND gate 406 is a logic high whenever both delay signal 102 and flip-flop output 422 are a logic high. AND gate outputs 406, 408 are routed to OR gates 410, 414, respectively. The other input to OR gates 410, 414 is provided by modulated signal 80 through logic circuit input 84. Accordingly, the output of OR gate 414 (the enable signal for switch assembly 16) is a logic high whenever either AND gate 408 output is a logic high or modulated signal 80 is a logic high. Similarly, the output of OR gate 410 (the enable signal for switch assembly 14) is a logic high whenever either AND gate output 406 is a logic high or modulated signal 80 is a logic high. The result is that the two enable signals 410, 414 alternate between outputting a pulse corresponding to modulated signal 80 and a pulse corresponding to delay signal 102. Thus, switch assemblies 14, 16 alternate each switching cycle C1, C2, C3, C4 between remaining enabled until after the other switch assembly 14, 16 is disabled and being disabled before the other switch assembly is disabled.

Figure 7:
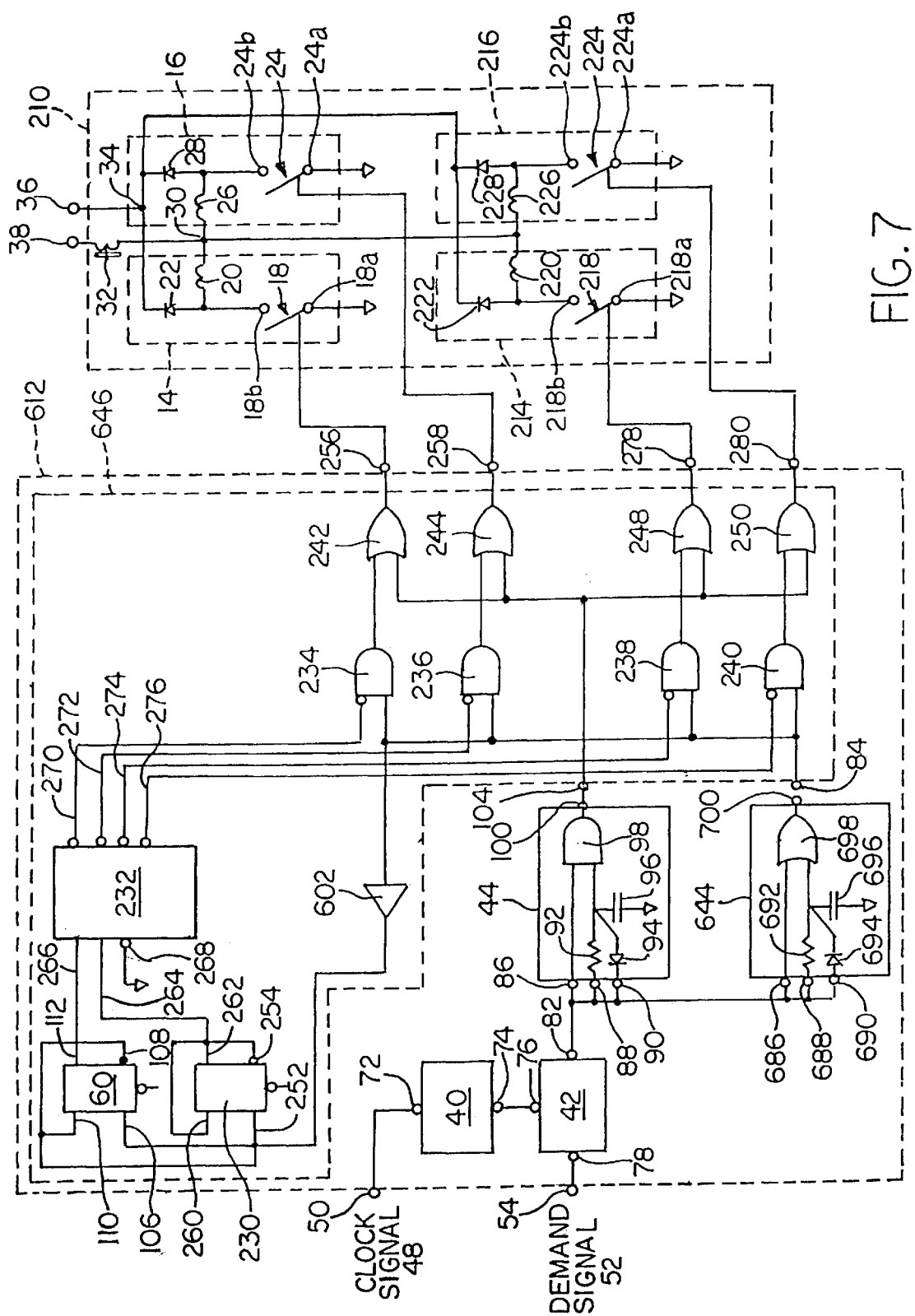
FIG. 7 is a schematic diagram of another embodiment of an apparatus according to the present invention.
Figure 8:
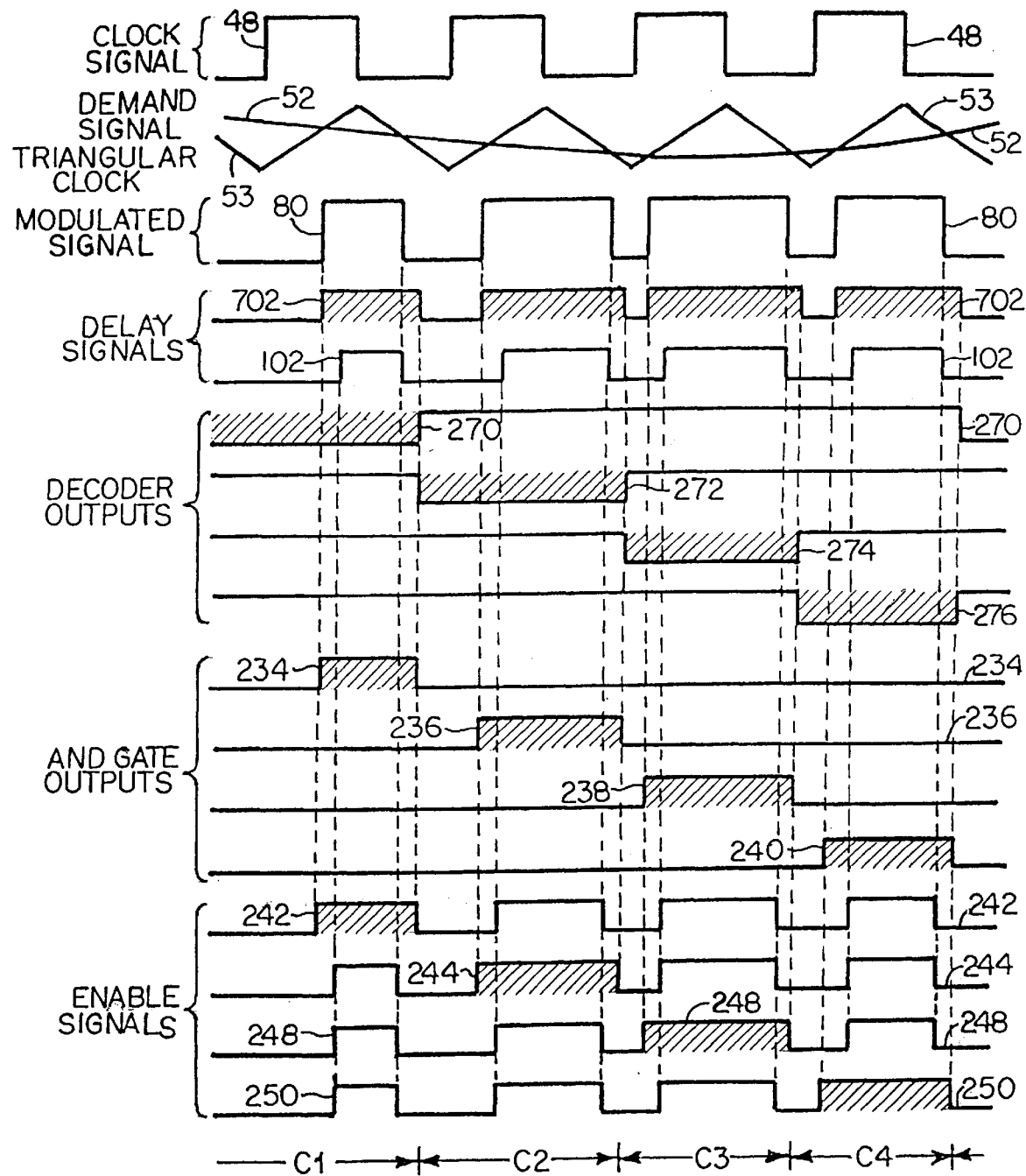
FIG. 8 is a waveform diagram similar to FIG. 2 of the embodiment of FIG. 7.

FIGS. 7 and 8 show yet another embodiment of the present invention including both ZVS and ZCT functions in one power switching assembly 210. Switching assembly 210 is identical to switching assembly 210 described in conjunction with FIG. 3 and retains the same reference designations. Switch controller 612 is similar to switch controller 212 of FIG. 3. Accordingly, like components retain the same reference designations. Like switch controller 212, switch controller 612 includes a triangle generator 40, a modulator 42, and a delay generator 44. The connections between these components are identical to those shown in FIG. 3. Switch controller 612 further includes a second delay circuit 644 which is identical to the first delay circuit 44 except that diode 694 is reversed in direction and gate 698 is an OR gate instead of an AND gate. Output 100 of delay circuit 44 is connected to input 104 of logic circuit 646. Output 700 of delay circuit 644 is connected to input 84 of logic circuit 646.

Logic circuit 646 is identical to logic circuit 246 of FIG. 3 except for the addition of inverter 602 between input 84 and input 106 of flip-flop 60. It should be noted that input 84 in FIG. 7 is connected to second delay circuit 644 as opposed to modulator 42, as was the case with FIG. 3. Additionally, it should be noted that instead of supplying clock signal 48 to flip-flop 60, the output of second delay circuit 644 is inverted through inverter 602 and provided to flip-flop 60.

As best shown in FIG. 8, clock signal 48 is converted to triangular clock signal 53. Triangular clock signal 53 is compared to demand signal 52 to create modulated signal 80 at output 82 of modulator 42. Modulated signal 80 is then passed through delay circuit 44, which outputs delay signal 102. As shown in FIG. 8, the leading edge of each pulse of delay signal 102 is delayed in time relative to the leading edge of a corresponding pulse of modulated signal 80. Modulated signal 80 is also passed through delay circuit 644, which outputs delay signal 702. The trailing edge of each pulse of delay signal 702 is delayed in time relative to the trailing edge of a corresponding pulse of modulated signal 80. Delay signal 702 is then routed through inverter 602, flip-flops 60, 230, and decoder 232 which provides decoder outputs 270, 272, 274, 276 to the inverting inputs of AND gates 234, 236, 238, 240, respectively. Delay signal 702 is also routed to the non-inverting inputs of AND gates 234, 236, 238, 240. Accordingly, as shown in FIG. 8, when delay signal 702 is a logic high and any one of the decoder outputs 270, 272, 274, 276 is a logic low, the corresponding AND gate output 234, 236, 238, 240 is a logic high.

AND gates outputs 234, 236, 238, 240 are routed to one input of OR gates 242, 244, 248, 250 which also receive as a second input delay signal 102. Accordingly, the output of OR gate 242, for example, is a logic high when either AND gate output 234 is a logic high or delay signal 102 is a logic high. As such, one of the enable signals 242, 244, 248, 250 begins before and ends after the remaining enable signals during each switching cycle C1, C2, C3, C4. Accordingly, a different switch assembly 14, 16, 214, 216 (or subset of switch assemblies) is enabled first to reduce turn-on power loss and disabled last to reduce turn-off power loss. The commuting of selected switch assemblies 14, 16, 214, 216 more evenly distributes the heat and stress of acting as an auxiliary switch.

Figure 9:
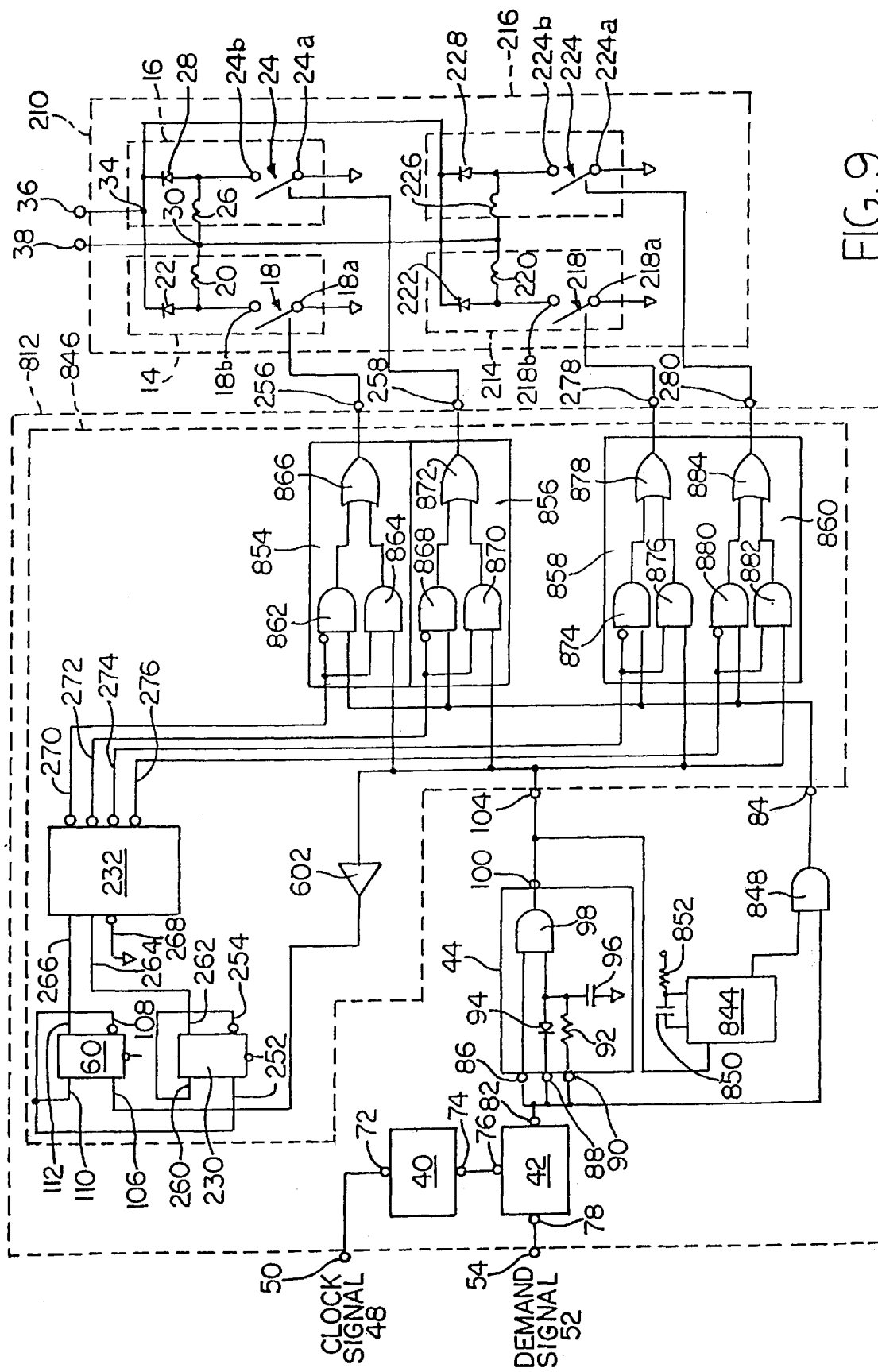
FIG. 9 is a schematic diagram of another embodiment of an apparatus according to the present invention.
Figure 10:
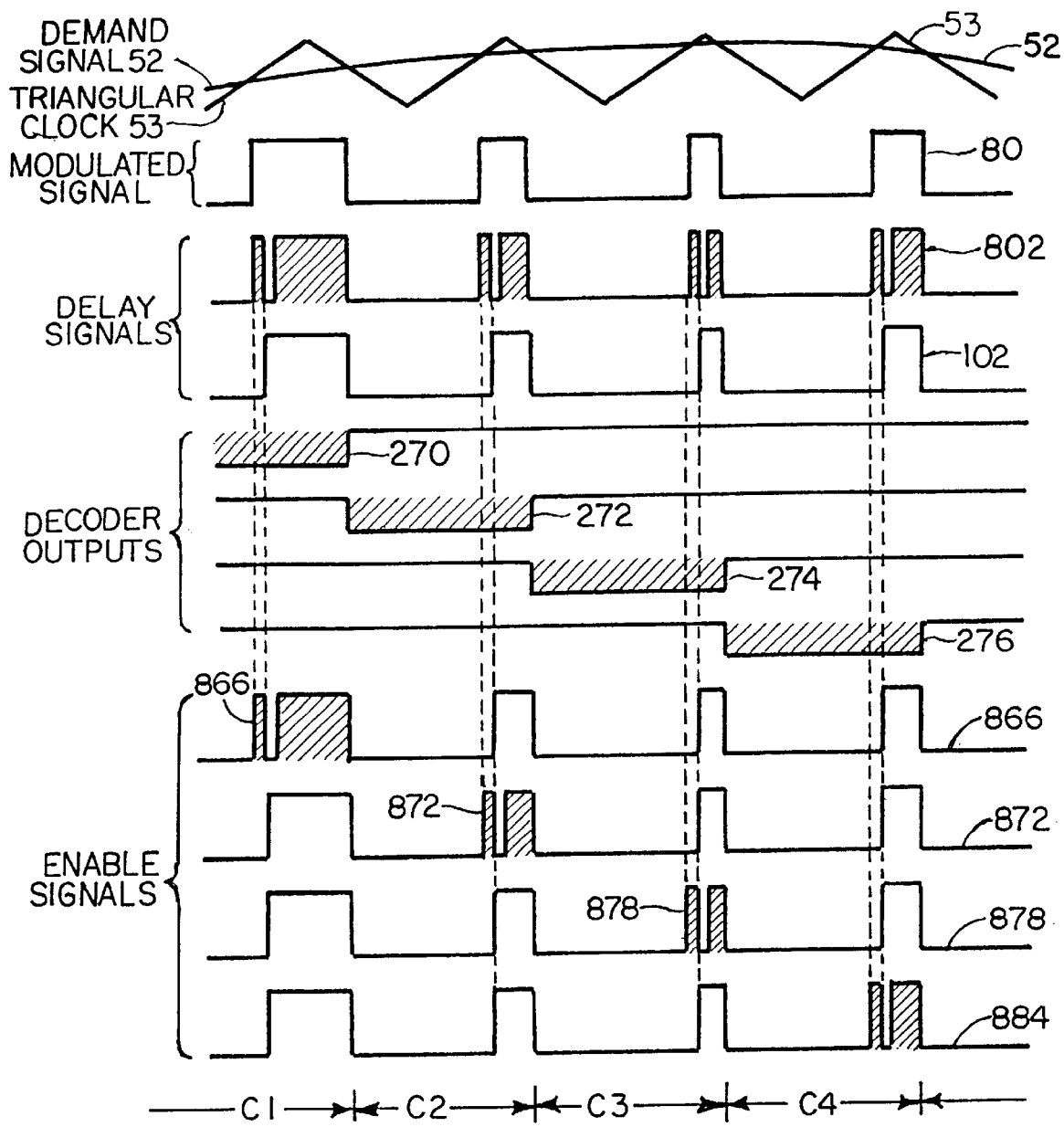
FIG. 10 is a waveform diagram similar to FIG. 2 of the embodiment of FIG. 9.

FIGS. 9 and 10 show another embodiment of the invention wherein the energy in the inductance of the circuit functioning as an auxiliary switch is recovered. Generally, by modifying the switching cycle of the switch functioning as the auxiliary switch, the energy in the interconnecting inductances can be returned to the main circuit. When this energy is returned, it is prevented from circulating and being dissipated in the switch assembly during its conduction phase. Whenever the L/R time constant of the parallel power switching assembly is less than or approximately equal to the enable time of the switch functioning as the auxiliary switch, as should commonly be the case, increased efficiency may be achieved through use of the embodiment described below. After the switch functioning as the auxiliary switch discharges its inductance, the parallel power switching assembly will naturally return the switch to a low (zero) voltage. After this occurs, the switch may be turned on to aid the other switching assemblies in the conduction cycle.

Referring now to FIG. 9, parallel power switch assembly 210 is identical to switching assembly 210 of FIGS. 3 and 7, and retains the same reference designations. Switch controller 812 is similar to switch controller 212 of FIGS. 3 and 7. Thus, like components retain the same reference designations. Switch controller 812, like switch controller 212, includes a triangle generator 40, a modulator 42, and a delay generator 44. The connections between these components are identical to those shown in FIGS. 3 and 7. Switch controller 812 further includes a one-shot 844 having an input connected to output 100 of delay generator 44 and an output connected to one input of AND gate 848. The other input of AND gate 848 is connected to output 82 of modulator 42. The output of AND gate 848 is connected to input 84 of logic circuit 846. The cycle time for one-shot 844 (also the regeneration time for the switching assembly 14, 16, 214, 216 acting as the auxiliary switch) is set by the RC time constant of capacitor 850 and resistor 852.

Logic circuit 846 is similar to logic circuit 646 of FIG. 7 except that AND gates 234, 236, 238, 240 and OR gates 242, 244, 248, 250 are replaced by four, 2-to-1 multiplexers 854, 856, 858, 860. Multiplexer 854 includes first and second AND gates 862, 864, respectively, and OR gate 866. The inverting input of first AND gate 862 is connected to decoder output 270, which is also connected to one input of second AND gate 864. The other input of first AND gate 862 is connected to input 84 of logic circuit 846 and receives delay signal 802 (FIG. 10) from AND gate 848. The other input of second AND gate 864 is connected to input 104 of logic circuit 846 and receives delay signal 102 (FIG. 10) from delay circuit 44. The outputs of first and second AND gates 862, 864 are connected to the inputs of OR gate 866. The output of OR gate 866 is connected to logic circuit output 256 and controls switching assembly 14.

The connections of multiplexers 856, 858, and 860 are similar to those described above, except that multiplexers 856, 858, and 860 are connected to decoder outputs 272, 274, and 276, respectively, and control switching assemblies 16, 214, and 216, respectively. Multiplexers 854, 856, 858, 860 route either delay signal 102 or delay signal 802 to switching assemblies 14, 16, 214, 216, respectively. Only one of switching assemblies 14, 16, 214, 216, selected by decoder 232, receives delay signal 802 during each switching cycle. As was the case with the earlier-described embodiments of the present invention, flip-flops 60, 230 are triggered by the falling edge of delay signal 102 (after inversion by inverter 602), thereby preventing reconfiguration during the conduction cycle of switching assemblies 14, 16, 214, 216. If modulator 42 saturates (i.e., demand signal 52 is greater than triangular clock 53), commutation of switching assemblies 14, 16, 214, 216 stops.

One-shot 844 is triggered by the rising edge of delay signal 102 which coincides with the ZVS turn-on of three of the four switching assemblies 14, 16, 214, 216. This is the optimum time to begin energy recovery because the energy in the inductance of the switching assembly 14, 16, 214, 216 acting as the auxiliary switch has not yet begun to dissipate in the switching assembly. The time constant of resistor 852 and capacitor 850 is set long enough to permit recovery of all of the inductor energy, and to permit switching assemblies 14, 16, 214, 216 to reach a ZVS condition. This time is proportional to the current requirements of parallel power switch assembly 210. One of ordinary skill in the art could readily modulate this time as a function of the measured current of parallel power switch assembly 210, but the energy gain would be small relative to the energy recovered during the regeneration cycle. In another embodiment, the circuit of FIG. 9 may be configured to sense the onset of the ZVS condition and enable the switching assembly 14, 16, 214, 216 acting as the auxiliary switch based on the occurrence of the ZVS condition.

Referring now to FIG. 10, modulated signal 80 from modulator 42 is a logic high when triangular clock 53 from triangle generator 40 is greater than demand signal 52. Modulated signal 80 is routed to one input of AND gate 848 (the other input of which is initially a logic high from the inverted output of one-shot 844) and to delay generator 44 (the output of which is initially a logic low). Since both inputs to AND gate 848 are logic high signals, the output (delay signal 802) is a logic high. After a delay time, determined by resistor 92 and capacitor 96, delay generator 44 transitions to a logic high. This triggers one-shot 844 to output a logic low, causing delay signal 802 to go low. Delay signal 802 remains a logic low for the duration of the RC time constant of resistor 852 and capacitor 850. After this time constant, one-shot 844 outputs a logic high, and delay signal 802 goes high. When modulated signal 80 transitions to a logic low, delay signal 102 from delay generator 44 goes low and delay signal 802 goes low because the modulated signal 80 input to AND gate 848 is low.

As shown in FIG. 10, decoder 232 sequentially enables multiplexers 854, 856, 858, and 860 with decoder output signals 270, 272, 274, and 276, respectively. When multiplexer 854 is enabled with decoder output 270 during switching cycle C1, the logical arrangement of AND gates 862, 864 and OR gate 866, for example, produce an output at OR gate 866 essentially identical to delay signal 802. The remaining multiplexer outputs at OR gates 872, 878, 884 correspond to delay signal 102. By sequentially enabling multiplexers 854, 856, 858, 860, decoder 232 commutes the switching assembly 14, 16, 214, 216 that functions as the auxiliary switch as described above in the descriptions of other embodiments of the invention.

Referring again to FIGS. 1, 3, 7 and 9 as previously described, the delay generator 44 uses AND gate 98 with resistor 92, capacitor 96 and diode 94 as a delay network. The delay network may be used to implement a fixed predetermined period of delay for enabling the remaining switch assembly(s) at ZVS that are not acting as the auxiliary switch. Selection of the optimum predetermined time delay involves consideration of all the various operating conditions which may affect reaching a ZVS condition. For example, when the current in the power switching assembly 10 is relatively large, it may take longer to fully gain control of the common node 30 when the commutating switching assembly(s) acting as the auxiliary switch ramps to larger currents. In addition, as the diodes 22, 28, 220, 228 heat, the reverse recovery currents may increase, thereby requiring a larger current of the switching assembly(s) acting as the auxiliary switch. Since the predetermined period of delay is increased to account for such varying conditions, unnecessary delay may result when such varying conditions do not have an effect on reaching the ZVS condition.

In another embodiment, direct sensing may be utilized to dynamically sequence the remaining switch assembly(s) intended to be enabled at ZVS conditions during each cycle. In this embodiment, the selection of a predetermined period of delay is unnecessary since the delay may be dynamically determined based on direct sensing of the switching voltage. Rather than using a fixed RC delay network as in the previous embodiments, the actual switching voltage may be observed at the common node 30. Accordingly, differences in timing at higher current and temperature may be inherently compensated to optimize switching by direct sensing of a zero voltage condition. In addition, pulses of almost any duration in the modulated signal 80 may be utilized to sequence the switching assemblies based on the zero voltage condition. The term zero voltage condition refers to the condition when the switching voltage drops to about zero volts relative to ground potential of the parallel power switching assembly 10.

For purposes of the following discussion, the switch assembly(s) 14, 16, 214, 216 enabled to perform the function of the previously discussed auxiliary switch will be referred to as the first switch, or first switch assembly and the switch assembly(s) enabled to perform the function of the remaining switch(s) will be referred to as the second switch, or second switch assembly. As previously described, the function of the first and second switches may be commutated (or cycled) through the switches. In another embodiment, a switch assembly may be designated to remain functioning as the first switch (auxiliary switch) for each cycle. In this embodiment, the first switch operates with an inductor 20, 26, 220, 226, however, the inductor 20, 26, 220, 226 may be omitted from the second switch.

Figure 11:
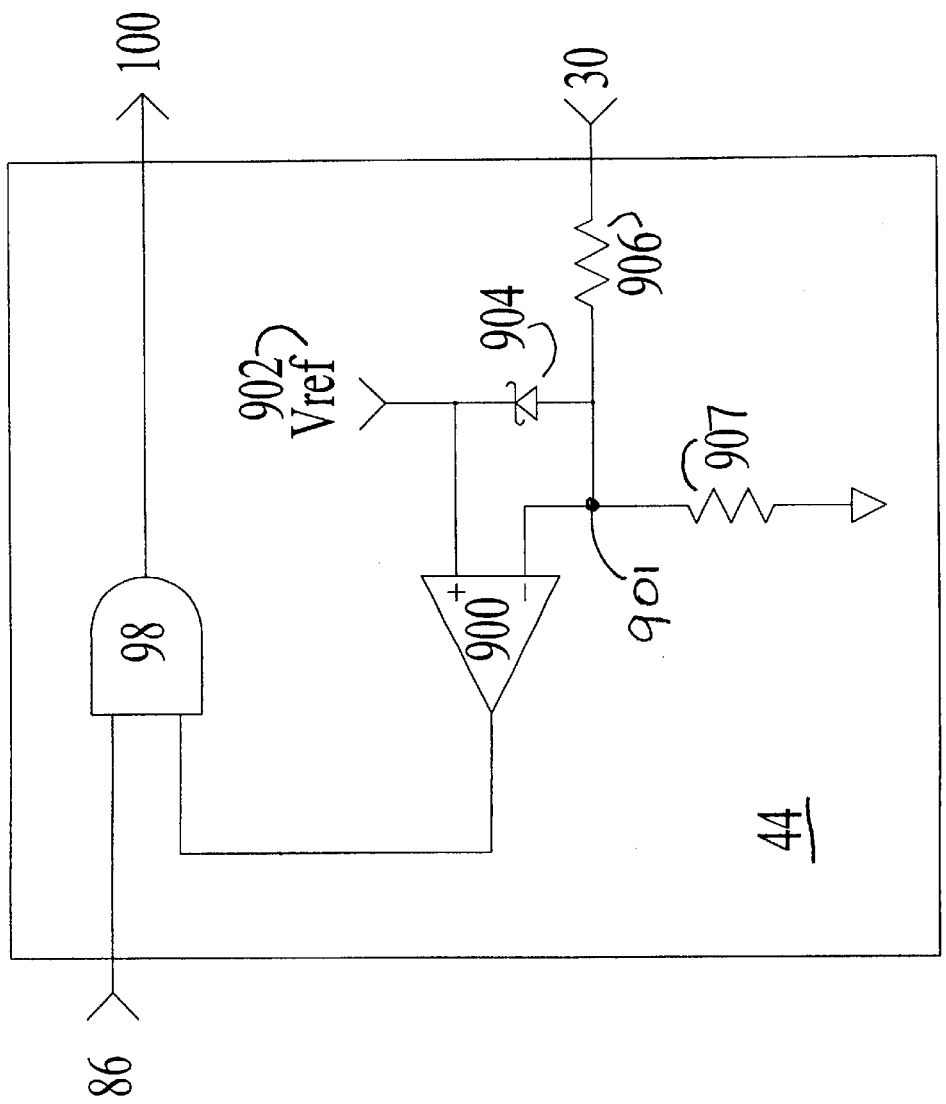
FIG. 11 is a schematic diagram of an embodiment of a delay generator for use in a switch mode power converter.

FIG. 11 is a circuit schematic of an embodiment of the delay generator 44 operating as a ZVS detector with direct sensing. The illustrated delay generator 44 includes AND gate 98, comparator 900, diode 904 and an attenuator formed by precision resistors depicted as first resistor 906 and second resistor 907. In other embodiments, other logic implementations, such as a programmable logic device, may be utilized to achieve similar functionality.

Referring to FIGS. 1, 3, 7, 9 and 11, during operation the delay generator 44 of this embodiment may monitor common node 30 using comparator 900. Comparator 900 may enable AND gate 98 to generate delay signal 102 on output 100 of the delay generator 44. As in the previous embodiments, the delay signal 102 may be provided to the input 104 of the logic circuit 46, 246, 446, 646, 846. In addition, the modulated signal 80 from modulator 42 may be provided to AND gate 98 via delay generator input 86. Previously discussed inputs 88 and 90 to the delay generator 44 may be omitted in this embodiment.

Comparator 900 may compare the voltage at threshold node 901 to reference voltage (Vref) 902. Vref 902 is a voltage consistent with the common mode range of comparator 900, such as, for example, in a range of two to five volts. Diode 904 may be utilized to prevent the difference between the input voltage formed at threshold node 901 and Vref 902 from exceeding the common-mode input voltage range of comparator 900. Thus, diode 904 may not be necessary in all implementations. When the voltage at threshold node 901, and therefore common node 30, drops below a threshold level indicative of a zero voltage condition, the comparator 900 may generate a logic high signal at AND gate 98.

The threshold level at threshold node 901 may be set with first and second resistors 906, 907 and Vref 902. The threshold level may be set to a voltage that is higher than the ultimate saturated switch potential in order to anticipate the zero voltage condition at the common node 30. Accordingly, the delay, such as charging delay of the second switch, may be anticipated by the switch controller 12, 212, 412, 612, 812 to optimize the timing of enablement. Thus, activation of the second switch may occur concurrently with the occurrence of the zero voltage condition to minimize delay once the zero voltage condition is reached.

In addition to optimizing enablement of the second switch to operate at the zero voltage condition, dynamic sensing of common node 30 may be utilized for protection against faults. Such faults may involve, for example, diode failures, short circuits or other conditions in which relatively high voltages are present. For example, should a fault exist on terminal 36 and/or common node 30 during detection of ZVS conditions, the ZVS condition may not be detected and therefore the second switch would not be enabled by the delay generator 44. Similarly, if a fault formed on terminal 36 and/or common node 30 during the interval when the first and second switches are on, the delay generator 44 may act to deactivate the second switch when the ZVS condition is no longer present at common node 30.

Figure 12:
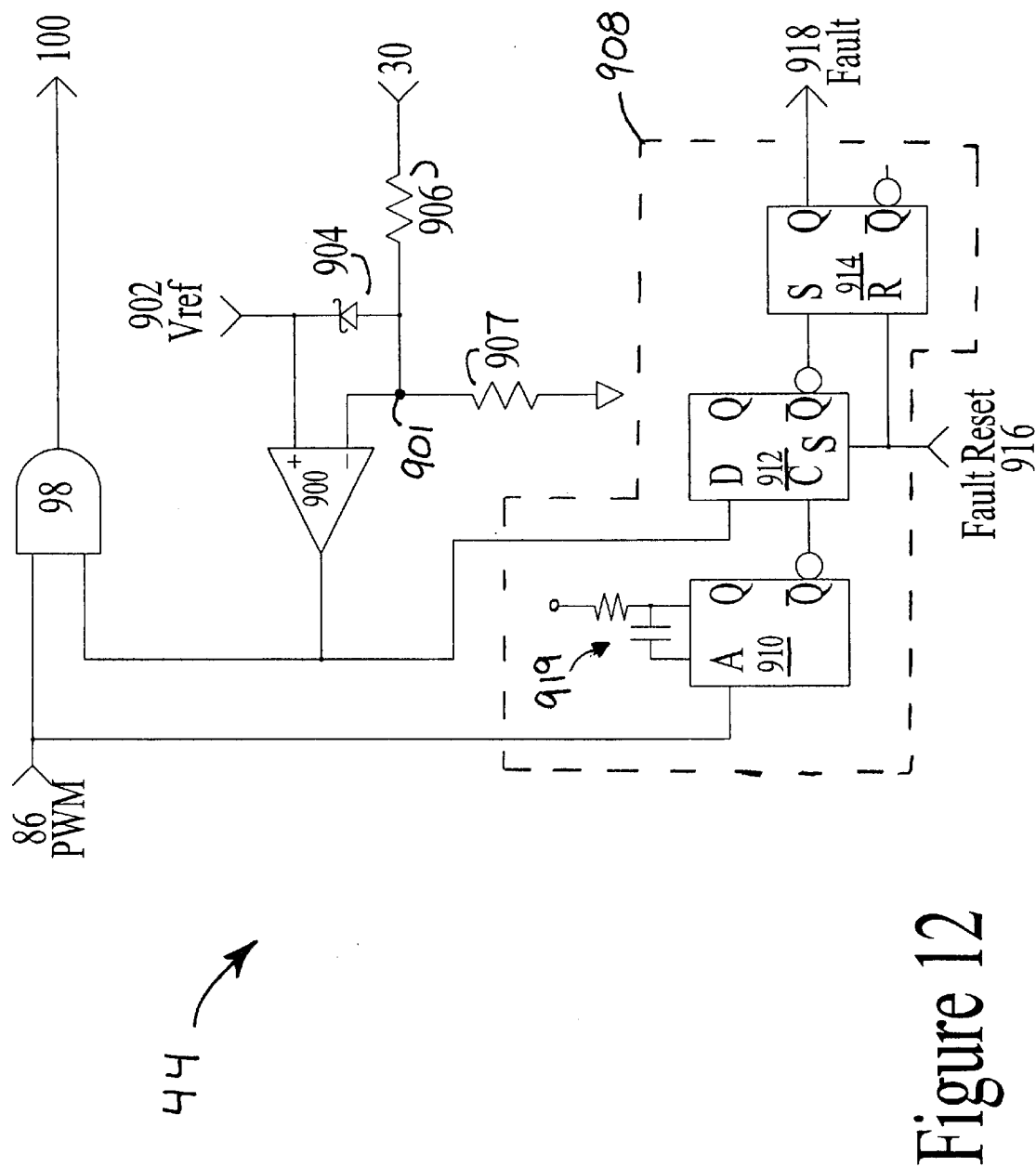
FIG. 12 is a schematic diagram of another embodiment of a delay generator.

FIG. 12 is a circuit schematic illustrating another embodiment of the delay generator 44. As in the previous embodiment discussed with reference to FIG. 11, the delay generator 44 includes AND gate 98, comparator 900, diode 904, first resistor 906 and second resistor 907 cooperatively operating as a ZVS detector. In addition, the delay generator 44 includes a fault latch circuit 908.

The fault latch circuit 908 of the illustrated embodiment includes timer 910, an edge-triggered flip-flop operating as data latch 912 and a static flip-flop operating as static latch 914. The timer 910 includes an RC network 919 to set a predetermined period of time for timer 910. In other embodiments, other logic implementations, such as a programmable logic device, may be utilized to achieve similar functionality.

During operation, timer 910 may automatically deactivate the first switch should ZVS conditions not form within the predetermined period of time. The predetermined period of time may be determined to allot the maximum time anticipated to reach the zero voltage condition on the common node 30. Determination of the maximum anticipated time may be based on operating conditions, such as, switching assembly temperatures, largest magnitudes of current, etc. Accordingly, exceedance of the maximum anticipated time indicates undesirable conditions, such as a fault between terminal 36 and common node 30.

If the output of comparator 900 has not indicated the zero voltage condition at the end of the timing interval set by timer 910, the inverted output of timer 910 may clock the logic low output of comparator 900 into data latch 912. The inverted output of data latch 912 may latch static latch 914. Static latch 914 may produce a fault signal on fault signal line 918. The fault signal on the fault signal line 918 may be used in whatever manner is desired for a system response to a fault. In one embodiment, the fault signal is utilized to immediately disable switching of the switch assemblies until corrective measures are taken. As is apparent, the full extent of the use of the fault signal is somewhat application specific.

A fault reset signal on a fault reset line 916 may clear static latch 914. The fault reset signal may be generated manually or automatically by the switch controller 12, 212, 412, 612, 812 and/or any other system associated with the switch mode power converter. In one embodiment, the fault reset signal may be provided upon system initialization as a power on clear-and-reset signal. In another embodiment, the switch controller 12, 212, 412, 612, 812 may wish to reinitiate operation of the parallel power switching assembly 10, 210 by resetting the static latch 914 with the fault reset signal. In still other embodiments, generation of the fault reset signal may be provided by any other system or device. Repeated attempts to clear static latch 914 may result in undesirable escalation in the operating temperatures of the switch assemblies.

Figure 13:
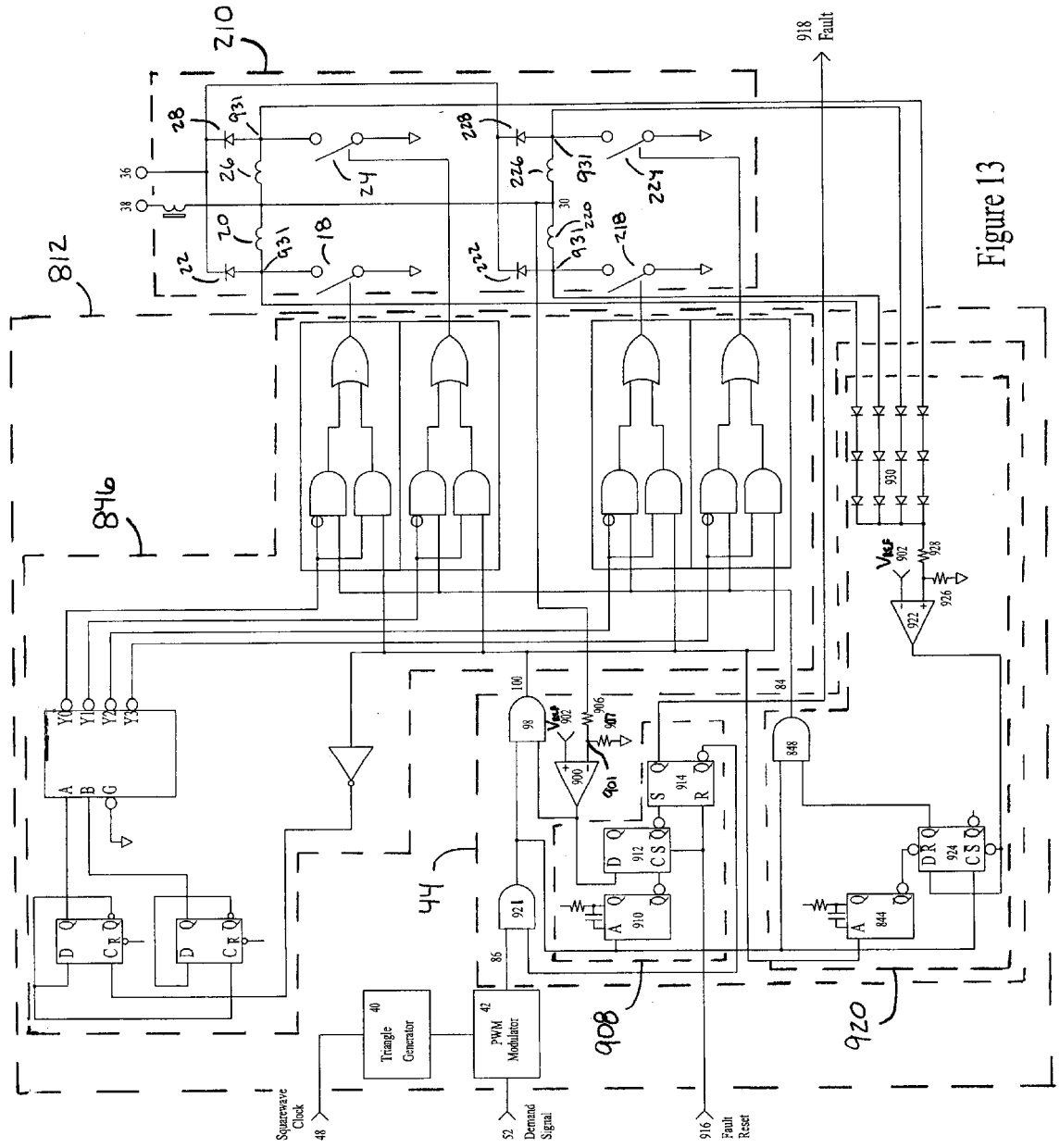
FIG. 13 is a schematic diagram of another embodiment of a delay generator used in the embodiment illustrated in FIG. 9.

FIG. 13 depicts another embodiment of the delay generator 44 implemented within the embodiment of switch controller 812 illustrated in FIG. 9. Switch controller 812 also includes triangle generator 40, modulator 42 and logic circuit 846. In addition, switch controller 812, cooperatively operates with the parallel power switching assembly 210 as previously discussed with reference to FIGS. 9 and 10. For purposes of brevity, the below discussion will focus on the delay generator 44 and cooperatively operating elements within the switch controller 812 and the parallel power switching assembly 210. Accordingly, unless otherwise indicated, the elements of the switch controller 812 and the parallel power switching assembly 210 are similar to previous embodiments and are therefore not redundantly identified/discussed with reference to FIG. 13.

The delay generator 44 of the illustrated embodiment operates as a ZVS detector and includes the fault latch circuit 908 as discussed with reference to FIGS. 11 and 12. Accordingly, like reference numerals designate corresponding parts. In addition, the delay generator 44 of this embodiment includes a regeneration control circuit 920 and an AND gate 921.

AND gate 921 of this embodiment illustrates an exemplary use of the fault signal on the fault signal line 918 as a lockout to stop all switching. When a fault is detected, as previously described, latch 914 may generate and output a logic high fault signal. An inverted fault signal may be provided as an input to AND gate 921. Thus AND gate 921 effectively disables the modulated signal 80 on the delay generator input 86 from reaching the remainder of the delay generator 44.

The regeneration control circuit 920 includes one-shot 844, AND gate 848, comparator 922, data latch 924 and OR gate 930. The regeneration control circuit 920 includes an additional implementation of ZVS sensing to determine the optimum time to re-enable the first switch (auxiliary switch) following the regeneration cycle discussed with reference to FIGS. 9 and 10. Accordingly, the delay generator 44 of this embodiment includes sensing of zero voltage conditions at the common node 30 to activate the second switch as well as sensing of zero voltage conditions across the first and second switches to reactivate the first switch following the regeneration cycle.

Referring again to FIGS. 9 and 10, one-shot 844 of in these embodiments may be used to set the delay for re-enabling the first switch (auxiliary switch) following regeneration to recover the energy in the inductance of the first switch. As previously discussed, the first switch may be switched open on the rising edge of the delay signal 102 by one-shot 844 to coincide with the activation of the second switch. In the embodiments of FIGS. 9 and 10, the delay time to allow the energy stored in the inductor (20, 26, 220 or 260) associated with the first switch, and therefore the voltage across the open first switch, to dissipate may be provided by one-shot 844. Following a predetermined time interval provided by one-shot 844 the first switch may again be closed to aid in conduction until the end of the switching cycle (C1, C2, C3, C4).

Referring again to FIG. 13, one-shot 844 may be similarly used to initiate the regeneration cycle. One-shot 844 of this embodiment, however, does not provide the predetermined time that the first switch remains open for the regeneration cycle. Instead of a predetermined time, the voltage across all the switches, such as, switches 18, 24, 218 and 224 in the illustrated embodiment may be monitored for a ZVS condition by sensing the voltage at respective switch nodes 931. Upon sensing the zero voltage condition on the switch nodes 931, the first switch may be re-closed.

Timing by one-shot 844 of this embodiment provides a predetermined delay to initiate the regeneration cycle. The predetermined time delay effectively delays comparator 922 from prematurely indicating that the zero voltage condition has been reached at the switch nodes 931. The delay of comparator 922 avoids erroneous sensing of the zero voltage condition during the transitional period when the regeneration cycle is first initiated. The predetermined time may be selected based on anticipated operating delays, such as propagation delay through the logic circuit, gate drivers and comparator 922.

During operation, the regeneration cycle of the first switch, such as, for example, switch 18, may occur when data latch 924 is reset by one-shot 844 thereby disabling the first switch (auxiliary switch). Once the energy stored in the inductance (such as, inductor 20) associated with the first switch has been delivered to terminal 36, the voltage across the first switch (auxiliary switch) may collapse to zero since the second switch (such as, switches 20, 220 and 226) is closed. Similar to previously discussed comparator 900, a threshold level may be developed using Vref 902 and an attenuator formed with precision resistors depicted as first resistor 926 and second resistor 928. Comparator 922 may be used to detect when the voltage at the first switch is sufficiently collapsed to justify re-enabling the first switch.

When the voltage has sufficiently collapsed, comparator 922 may generate a logic low which is inverted to set data latch 924. Data latch 924 may in turn drive AND gate 848 in conjunction with the modulated signal 80 to reactivate the first switch (auxiliary switch) to close and participate in conduction until the end of the switching cycle.

OR gate 930 of this embodiment is a plurality of diodes formed as a wired-OR detector of all of the switch nodes 931. The diodes may be small-signal devices electrically connected in series since low-current fast diodes are not generally available for high voltage applications. Preferably, the diodes are small signal devices to maximize speed; however other diodes, such as larger current power diodes for high voltage applications may also be used in other embodiments. OR gate 930 provides a signal to the attenuator of comparator 922 indicative of the absence of the zero voltage condition when any of the switch nodes 931 are not at the zero voltage condition.

In the illustrated embodiment, all of the switch nodes 931 may be monitored since the first switch may be commutated during operation. Accordingly, since the first switch will be the last switch to assume the ZVS condition during a switching cycle, rather than duplicate the comparator 922 four times followed by a four-input OR gate, the switch nodes 931 are combined with OR gate 930 as illustrated. In other embodiments, with dedicated auxiliary switch(s), only the switch nodes 931 of the switch(s) operating as the auxiliary switch(es) are detected.

The output of OR gate 930 is attenuated to comparator 922 by resistors 926 and 928 analogous to the case of comparator 900 and resistors 906 and 907 discussed with reference to FIG. 11. In addition, a diode may also be used to bound common mode voltage similar to diode 904 of FIG. 11 thereby limiting the input voltage of comparator 922.

At the start of a switching cycle when no fault is present, the output of comparator 922 may be at a logic high state indicative of voltage across the switches (voltage on the switch nodes 931). Thus the leading edge of modulated signal 80 on delay generator input 86 may latch the logic high state of comparator 922 into data latch 924. As a result, AND gate 848 may output a logic high signal thereby enabling the first switch (auxiliary switch) to close.

If, however, the voltage at the switch node(s) 931 is for some reason already zero at the start of a switch cycle, comparator 900 may be outputting a logic high signal enabling the second switch to immediately engage without delay since the zero voltage condition is also present on the common node 30. The logic high signal from the comparator 900 also triggers one-shot 844 to begin timing. In addition, one-shot 884 outputs a logic low signal which is inverted and resets the data latch 924 such that AND gate 848 outputs a logic low signal and comparator 922 is delayed from indicating a zero voltage condition on switch nodes 931. The logic low signal may deactivate the first switch as part of the regeneration cycle.

Once one-shot 844 times out, comparator 922 may provide indication when the zero voltage condition is sensed on the switch nodes 931. Comparator 922 may output a logic low to reactivate the first switch when the zero voltage condition is detected. The logic low output of comparator 922 may set data latch 924 thereby enabling AND gate 848 to reactivate the first switch and complete the re-generation cycle.

Figure 14:
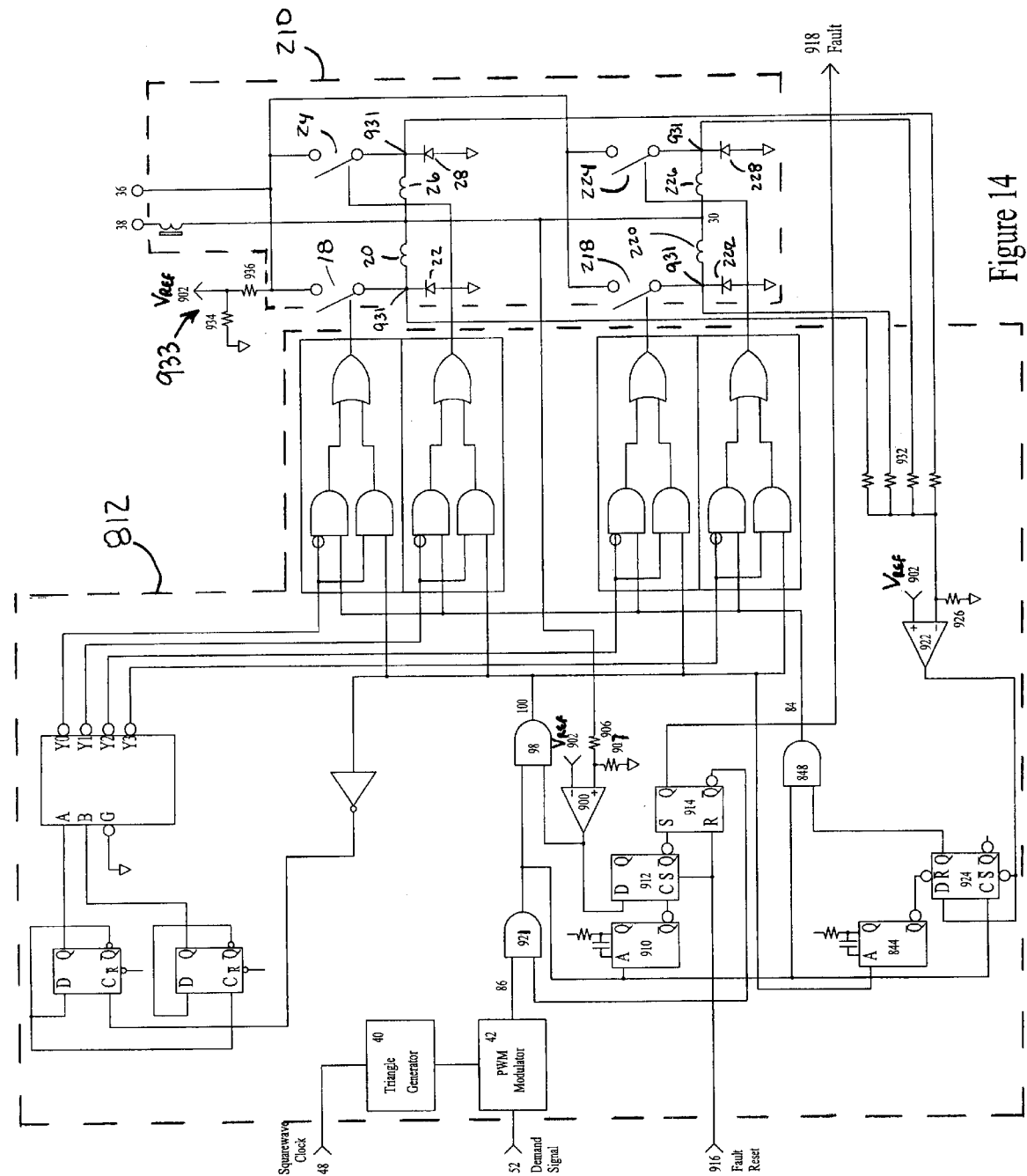
FIG. 14 is a schematic diagram of another embodiment of a delay generator and a parallel power switch used in a high side switch version of the embodiment illustrated in FIG. 9.

FIG. 14 illustrates another embodiment of the parallel power switching assembly 210 cooperatively operating with the switch controller 812 of FIG. 13. Except for being configured for high side switching, the parallel power switching assembly 210 and switch controller 812 of this embodiment are similar to the parallel power switching assembly 210 and switch controller 812 of FIG. 13. Accordingly, for purposes of brevity, the below discussion will focus on the differences with FIG. 13.

In the high side switching configuration, the switch nodes 931 are moved between the switches 18, 24, 218, 224 and ground. Accordingly, the control input of each switch is referenced to common node 30 which couples the switches 18, 24, 218, 224 to their respective diodes 22, 28, 222, 228 and inductors 20, 26, 220, 226. In this configuration comparators 900 and 922 may be referenced to the supply common of the high-side switches to perform ZVS sensing. Similar to FIG. 13, comparator 900 may be coupled with the common node 30 and comparator 922 may be coupled with switch nodes 931. In this embodiment, however, Vref 902 is developed by an attenuator 933 formed with precision resistors depicted as a first resistor 934 and a second resistor 936 to maintain an association between common node 30 and Vref 902.

At ZVS conditions common node 30 may essentially be at the potential of terminal 36. Accordingly, the attenuator to comparator 900 formed by precision resistors 906 and 907 may be toleranced to produce a logic high from comparator 900 when the zero voltage condition occurs. It should also be noted that comparator 900 is poled opposite to the poling used in FIG. 13. Similarly, comparator 922 is poled opposite to that in FIG. 13. In addition, OR gate 930 has been replaced with AND gate 932. AND gate 932 of the illustrated embodiment may be formed with matched precision resistors which are toleranced such that the output of comparator 922 will be low when all of the switch nodes 931 are nearing the potential of terminal 36.

As is apparent in FIGS. 1, 3, 5, 7, 9, 13, and 14, the ground connection utilized by the parallel power switching assembly 10, 210 may be galvanically isolated from the ground connection utilized by the switch controller 12, 212, 412, 612, 812. Accordingly, where the potential of the two ground connections may be different, the comparators 900, 922 of FIGS. 13 and 14 may include galvanic isolation. For example, Vref 902 and the attenuators may be referenced to the same ground as the parallel power switching assembly 10, 210. Accordingly, high voltage isolation, such as opto-isolators on the output of the comparators 900, 922 may be utilized to avoid introduction of non-compatible voltage levels into the remaining circuitry of the switch controller 12, 212, 412, 612, 812.

Figure 15:
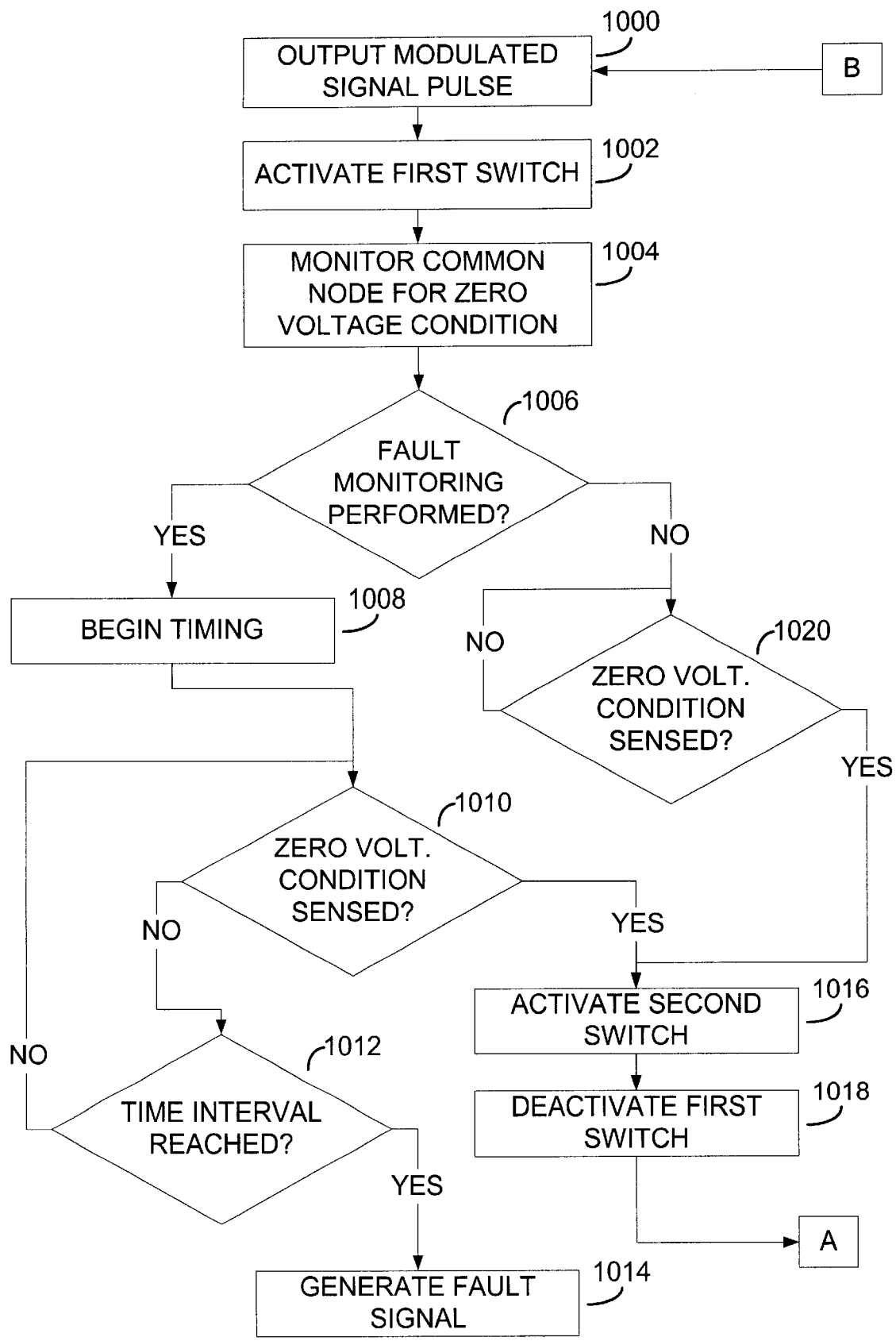
FIG. 15 is a flow diagram illustrating operation of one embodiment of a switch mode power converter.

FIG. 15 is a block diagram illustrating operation of an exemplary embodiment of a switch mode power converter discussed with reference to FIGS. 1–14. The operation begins at block 1000 when the demand is modulated with modulator 42 and the modulated signal 80 is outputted in the form of a pulse. At block 1002, the first switch is activated in response to the rising edge of the pulse. Comparator 900 monitors the common node 30 for the zero voltage condition at block 1004. At block 1006, it is determined whether fault monitoring is being performed. If yes, timer 910 begins timing at block 1008.

At block 1010, it is determined whether the zero voltage condition has been sensed on the common node 30. If no, it is determined if timer 910 has reached the predetermined time interval at block 1012. If the time interval has not been reached, the operation returns to block 1010. If the timer has reached the end of the allotted timing interval, the fault signal is generated on the fault signal line 918 at block 1014.

If at block 1010, the zero voltage condition has been sensed, the second switch is activated at block 1016. In addition, at block 1018, the first switch is deactivated.

Returning to block 1006, if fault monitoring is not performed, the operation determines if the zero voltage condition is sensed at block 1020. If no, the operation remains at block 1020 and continues sensing. When the zero voltage condition is sensed, the operation proceeds to blocks 1016 and 1018 to activate the second switch and deactivate the first switch.

Figure 16:
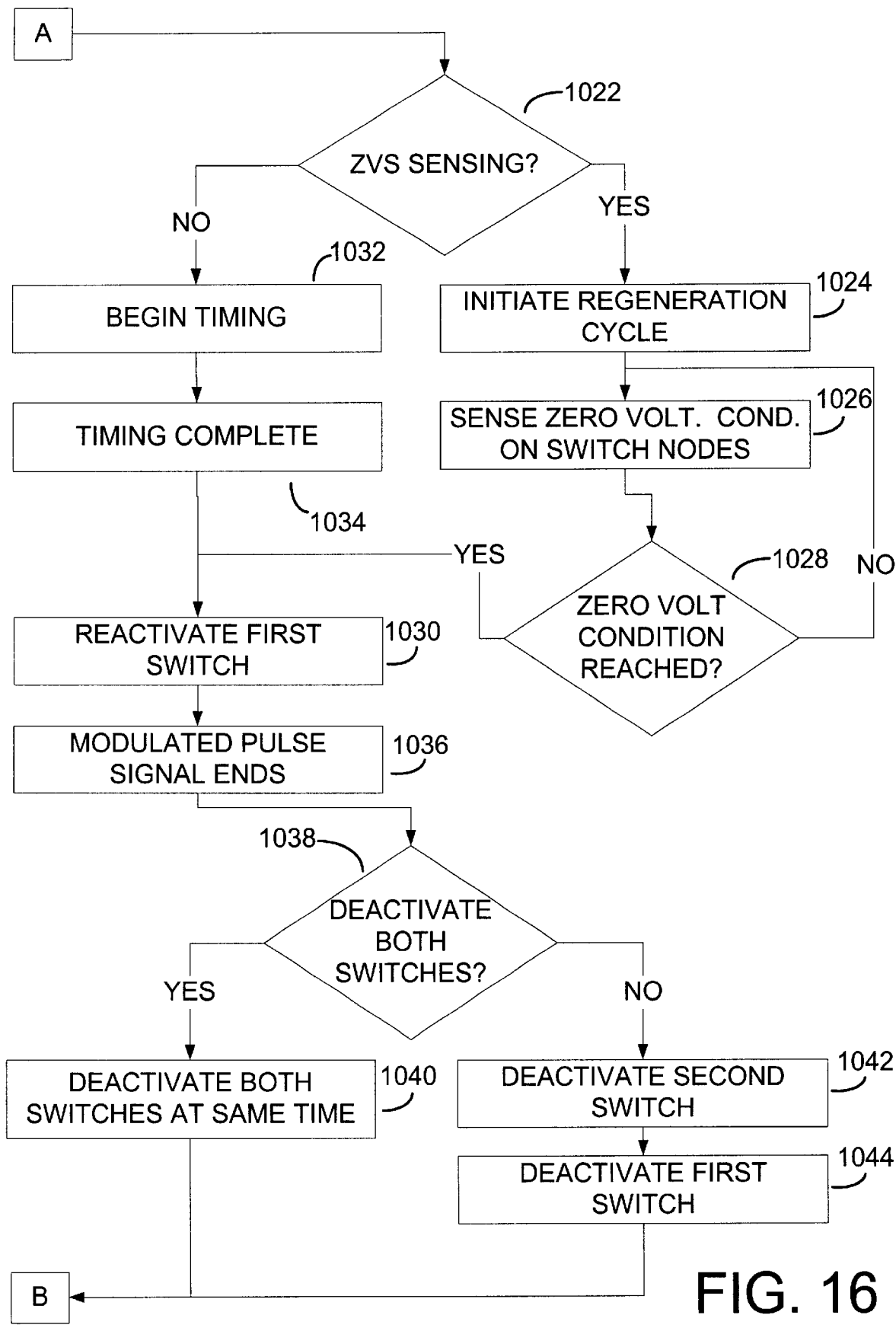
FIG. 16 is a second part of the flow diagram of FIG. 15.

Referring now to FIG. 16, at block 1022, it is determined if ZVS sensing will be used to determine the optimum time to reactivate the first switch. If yes, one shot 844 initiates the beginning of the regeneration cycle at block 1024. At block 1026, one shot 844 has timed out and comparator 922 senses the zero voltage condition on the switch nodes 931. At block 1028, it is determined if the zero voltage condition across the first and second switches has been reached. If no, the operation returns to block 1026. If the zero voltage condition has been reached at block 1028, the first switch is reactivated at block 1030. Returning to block 1022, if ZVS sensing is not used, one-shot 844 begins timing at block 1032. At block 1034, one shot 844 times out and the operation continues at block 1030 where the first switch is reactivated.

At block 1036, the pulse from the modulator 42 ends. It is determined if both the first and second switches are deactivated at the same time at block 1038. If yes, the first and second switches are deactivated at the same time at block 1040 and the operation then returns to block 1000. If the first and second switches are not deactivated together, the second switch is deactivated at block 1042. At block 1044, the first switch is deactivated and the operation then returns to block 1000.

The previously described embodiments provide a switch mode power converter capable of switching under ZVS conditions using parallel switching assemblies coupled with a common node. By delaying activation of the second switch after activating the first switch, ZVS conditions may be achieved before the second switch is activated. Sensing of the switching voltage provides a dynamically adjusting delay to optimize activation of the second switch at zero voltage conditions. In addition, faults may be detected by sensing the inability to reach zero voltage conditions following activation of the first switch. The first switch may also be cycled from open back to closed following activation of the second switch to recover energy in the inductance associated with the first switch. Sensing of the voltage across the first switch may be utilized to ensure complete recovery of the energy as well as reactivation of the first switch at zero voltage conditions at the conclusion of the recovery of the energy.

Although the present invention has been shown and described in detail, the same is to be taken by way of example only and not by way of limitation. Numerous changes can be made to the embodiments described above without departing from the scope of the invention.

What is claimed is:

1. A method for reducing the power loss due to switching of a switch mode power converter having a first switch assembly connected through a first inductor to a common node and a second switch assembly connected through a second inductor to the common node, the method comprising:

activating the first switch assembly before activating the second switch assembly during a first switching cycle;

deactivating the first switch assembly after deactivating the second switch assembly during the first switching cycle;

activating the second switch assembly before activating the first switch assembly during a second switching cycle which begins at the end of the first switching cycle; and deactivating the second switch assembly after deactivating the first switch assembly during the second switching cycle.

2. The method of claim 1 further comprising outputting a first and second enable pulse to the first and second switch assemblies, respectively, each switch assembly being activated by a leading edge of its respective enable pulse and deactivated by a trailing edge of its respective enable pulse.

3. The method of claim 2 further comprising deriving the enable pulses from a demand signal by modulating the demand signal.

4. The method of claim 1, where activating the first switch assembly before the second switch assembly comprises switching the second switch assembly in response to a zero voltage condition sensed on the common node, and deactivating the first switch assembly after the second switch assembly comprises approaching zero current turn off.

5. The method of claim 1, further comprising alternating between initial activation of the first and second switch assemblies to distribute power losses and attendant stress.

6. A method for reducing the power loss due to switching of a switch mode power converter having a first switch assembly connected through an inductor to a common node and a second switch assembly connected to the common node in parallel with the first switch assembly, the method comprising:

activating the first switch assembly before activation of the second switch assembly;

detecting a zero voltage condition at the common node;

activating the second switch assembly in response to detection of the zero voltage condition;

deactivating the first switch assembly when the second switch assembly is activated;

detecting a zero voltage condition at the first switch assembly; and reactivating the first switch assembly in response to detection of the zero voltage condition at the first switch assembly.

7. The method of claim 6, where detecting a zero voltage condition at the common node comprises:

timing for an allotted time interval that commences upon activation of the first switch assembly; and generating a fault signal when the second switch assembly is not activated prior to the end of the time interval.

8. The method of claim 6, where reactivating the first switch assembly comprises maintaining activation of the second switch assembly.

9. The method of claim 6, further comprising deactivating the first and second switch assemblies at the same time.

10. The method of claim 6, where detecting a zero voltage condition at the common node comprises anticipating a zero voltage condition to optimize timing to activate the second switch assembly.

11. The method of claim 6, where deactivating and reactivating the first switch assembly comprises recovering energy from an inductor of the first switch assembly during a regeneration cycle.

12. The method of claim 6, where detecting a zero voltage condition comprises comparing a threshold voltage to a reference voltage.

13. The method of claim 6, where the second switch assembly is coupled through an inductor to the common node, the method further comprising trading the acts of the first switch assembly and the second switch assembly in subsequent cycles.

14. A method of reducing the power loss due to switching of a switch mode power converter having a first switch assembly connected through a first inductor to a common node and a second switch assembly connected through a second inductor to the common node, the first switch assembly in parallel with the second switch assembly, the method comprising:

activating the first switch assembly;

activating the second switch assembly after activation of the first switch assembly as a function of a zero voltage condition sensed at a common node;

deactivating the first switch assembly concurrent with activating the second switch assembly; and reactivating the first switch assembly as a function of a zero voltage condition sensed across the first switch assembly and the second switch assembly.

15. The method of claim 14, further comprising generating a fault signal in the absence of the zero voltage condition at the common node for longer than a predetermined period of time subsequent to activation of the first switch assembly.

16. The method of claim 14, where deactivating and reactivating the first switch assembly comprises recovering energy from an inductor in the first switch assembly until the zero voltage condition across the first and second switch assemblies is reached.

17. A switch mode power converter, comprising:

a first switch and a second switch connected in parallel to a common node, the first switch including an inductor; and a controller coupled with the first and second switches, the controller operable to activate the first switch followed by the second switch during a switching cycle, where the controller includes a delay generator, the delay generator operable to sense zero voltage conditions, where the second switch is activated and the first switch is deactivated during the switching cycle in response to a zero voltage condition sensed at the common node, the first switch reactivated in response to a zero voltage condition sensed across the first switch and the second switch during the switching cycle.

18. The switch mode power converter of claim 17, wherein the first and second switches are configured in a high-side switching configuration.

19. The switch mode power converter of claim 17, wherein the delay generator comprises a comparator for sensing zero voltage conditions.

20. The switch mode power converter of claim 17, wherein the delay generator comprises a fault latch circuit operable to generate a fault signal in response to failure to reach the zero voltage condition at the common node within a predetermined time interval.

21. The switch mode power converter of claim 17, wherein the delay generator comprises a regeneration control circuit, the regeneration control circuit including an OR gate and a comparator, the OR gate operable to provide a signal indicative of zero voltage conditions of the first and second switches.

22. The switch mode power converter of claim 17, where the second switch includes an inductor and the controller is operable to trade the function of the first switch and the second switch in subsequent switching cycles.

* * * * *